(12) United States Patent
Unagami et al.

(10) Patent No.: US 11,876,913 B2
(45) Date of Patent: Jan. 16, 2024

(54) CONTROL METHOD, CONTROL SYSTEM, FIRST SERVER, AND DATA STRUCTURE

(71) Applicant: Panasonic Intellectual Property Corporation of America, Torrance, CA (US)

(72) Inventors: Yuji Unagami, Osaka (JP); Junichiro Soeda, Nara (JP); Junji Michiyama, Fukuoka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 200 days.

(21) Appl. No.: 17/159,629

(22) Filed: Jan. 27, 2021

(65) Prior Publication Data

US 2021/0151203 A1 May 20, 2021

Related U.S. Application Data

(63) Continuation of application No. PCT/JP2019/041096, filed on Oct. 18, 2019.
(Continued)

(51) Int. Cl.
*H04L 9/32* (2006.01)
*G16Y 40/10* (2020.01)
(Continued)

(52) U.S. Cl.
CPC ............ *H04L 9/3247* (2013.01); *G16Y 20/40* (2020.01); *G16Y 40/10* (2020.01); *H04L 9/0643* (2013.01); *H04L 9/50* (2022.05)

(58) Field of Classification Search
None
See application file for complete search history.

(56) References Cited

U.S. PATENT DOCUMENTS

2017/0046652 A1\* 2/2017 Haldenby ............. G06F 21/645
2018/0096121 A1\* 4/2018 Goeringer ............... G06F 21/32
(Continued)

OTHER PUBLICATIONS

International Search Report (ISR) dated Nov. 26, 2019 in International (PCT) Application No. PCT/JP2019/041096.
(Continued)

*Primary Examiner* — Kevin T Bates
*Assistant Examiner* — Emad Siddiqi
(74) *Attorney, Agent, or Firm* — Wenderoth, Lind & Ponack, L.L.P.

(57) ABSTRACT

A control method according to the present disclosure is executed by a first server of servers in a system including one or more IoT devices and the servers. The method includes: obtaining first transaction data including operation notification information and time information from each of the IoT devices, the operation notification information including identification information on the IoT device and a notification indicating that the IoT device is operating, the time information indicating a time when the IoT device has obtained the operation notification information; transferring the obtained first transaction data to second servers different from the first server; executing a first consensus algorithm together with the second servers; and recording a block containing the first transaction data in a distributed ledger of the first server, when the authenticity of the first transaction data is verified by the first consensus algorithm.

10 Claims, 17 Drawing Sheets

Related U.S. Application Data

(60) Provisional application No. 62/747,303, filed on Oct. 18, 2018.

(51) Int. Cl.
*G16Y 30/10* (2020.01)
*G16Y 20/40* (2020.01)
*H04L 9/06* (2006.01)
*H04L 9/00* (2022.01)

(56) References Cited

U.S. PATENT DOCUMENTS

2018/0189730 A1* 7/2018 Wilkinson .............. G07F 17/13
2021/0326992 A1* 10/2021 Leise .................... H04L 9/3249

OTHER PUBLICATIONS

"GMO Internet Group, Saison Information Systems Co., Ltd., and Parco Co., Ltd. have jointly conducted the second field trial utilizing blockchain and IoT", https://cloud.z.com/jp/news-ep/iot/, Jun. 21, 2017 (cited in the specification and partial English translation).
Extended European Search Report dated Nov. 16, 2021 in corresponding European Patent Application No. 19874700.8.
Valentina Gatteschi et al., "To Blockchain or Not to Blockchain: That Is the Question", IT Professional, vol. 20, No. 2, Mar. 2018, pp. 62-74.
Communication pursuant to Article 94(3) EPC dated Jun. 9, 2022 in corresponding European Patent Application No. 19874700.8.

* cited by examiner

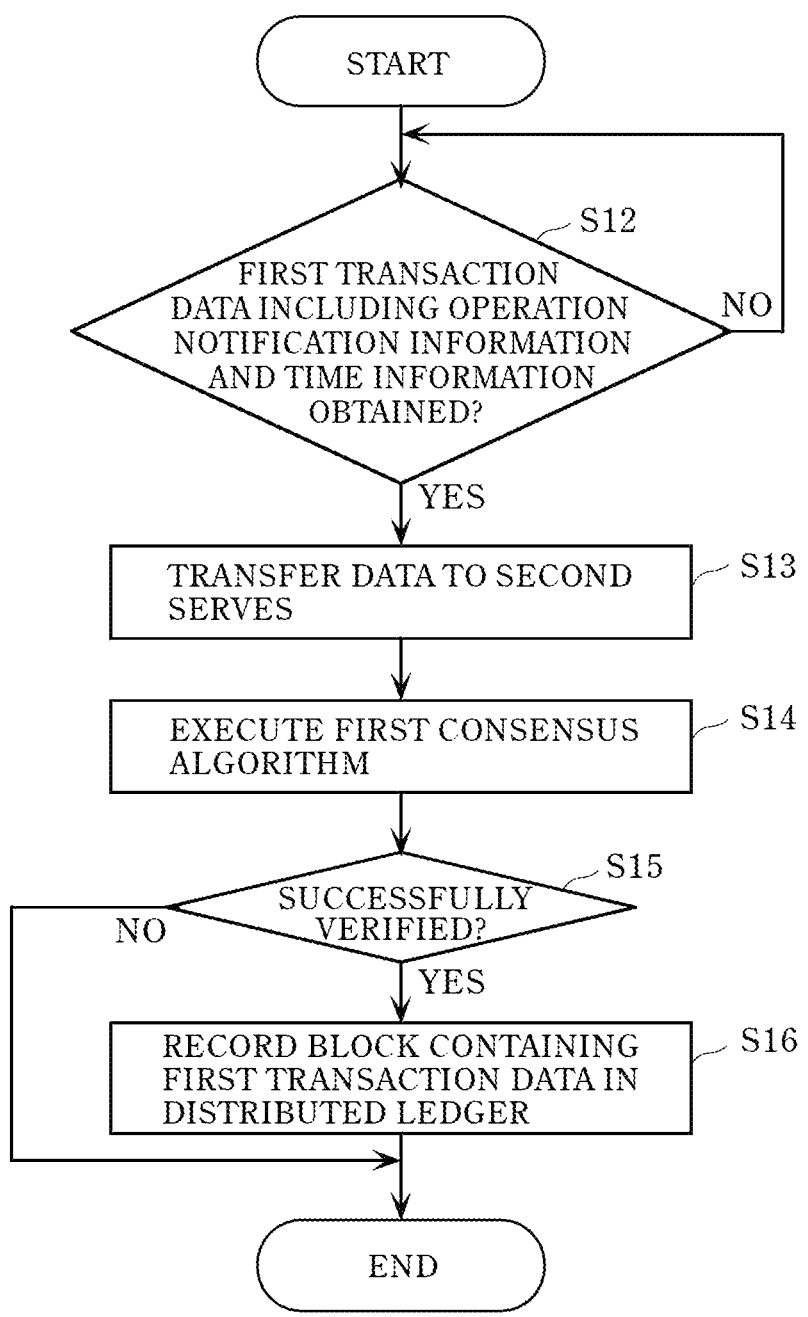

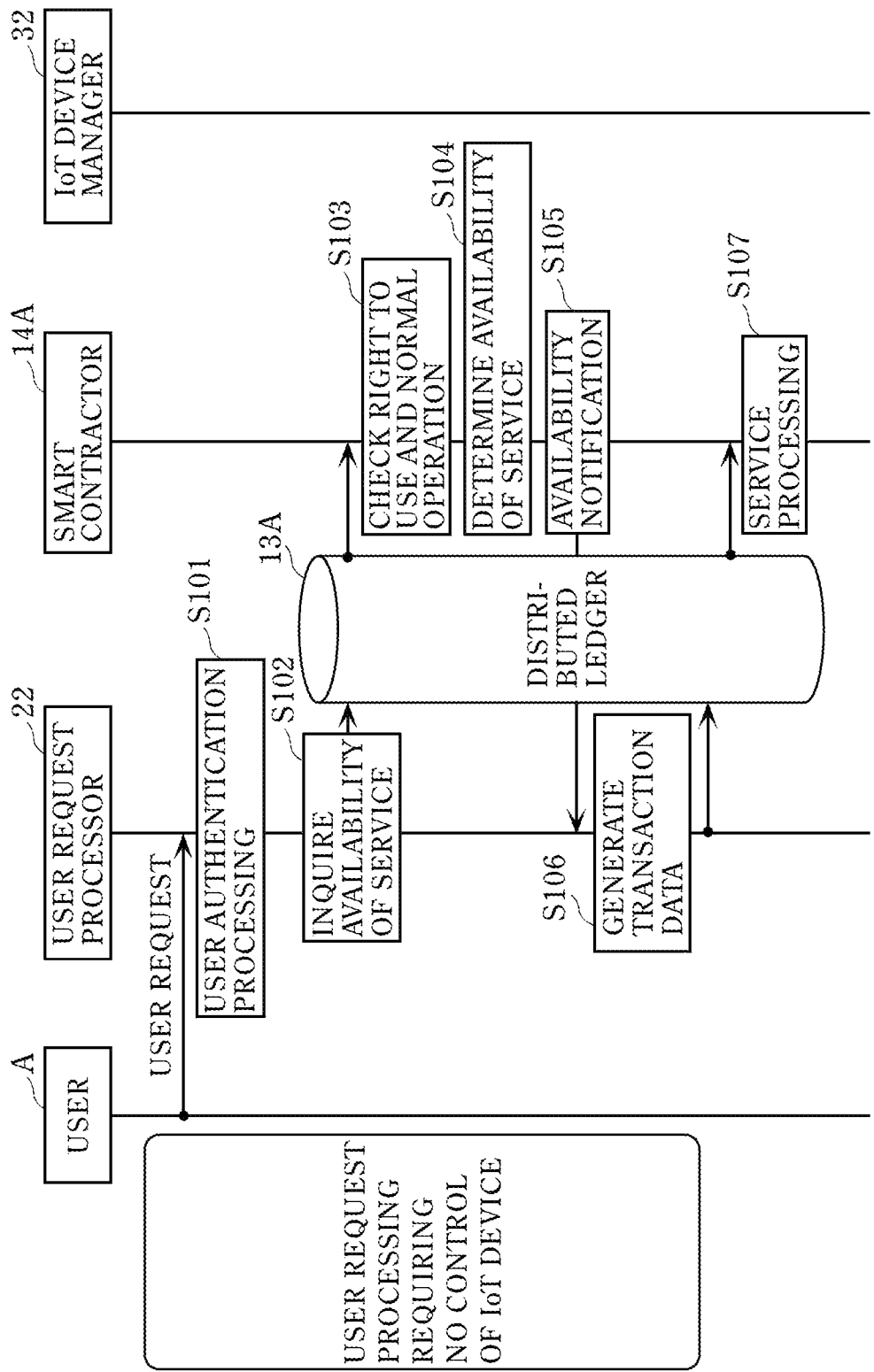

FIG. 11A

| usrA | query_reserve | 0002 |

FIG. 11B

| 0002 | ¥100 | Not use |

FIG. 11C

| usrA | reserve | 0002 |

FIG. 13A

| 0002 | ¥100 | usrA |

FIG. 13B

| usrA | open | 0002 |

FIG. 13C

| dev | regist_opened | 0002 |

FIG. 15

| dev | enabled | 0002 |
|---|---|---|

FIG. 16A

| IoT DEVICE No. | RIGHT HOLDER | TIME OF NOTIFYING NORMAL OPERATION |
|---|---|---|
| 0001 | USER A | 9/26 10:00 |
| 0002 | SERVICE COMPANY | 9/26 10:00 |
| 0003 | SERVICE COMPANY | 9/26 10:00 |

FIG. 16B

| IoT DEVICE No. | RIGHT HOLDER | TIME OF NOTIFYING NORMAL OPERATION |
|---|---|---|
| 0001 | USER A | 9/26 11:00 |
| 0002 | SERVICE COMPANY | 9/26 10:00 |
| 0003 | SERVICE COMPANY | 9/26 11:00 |

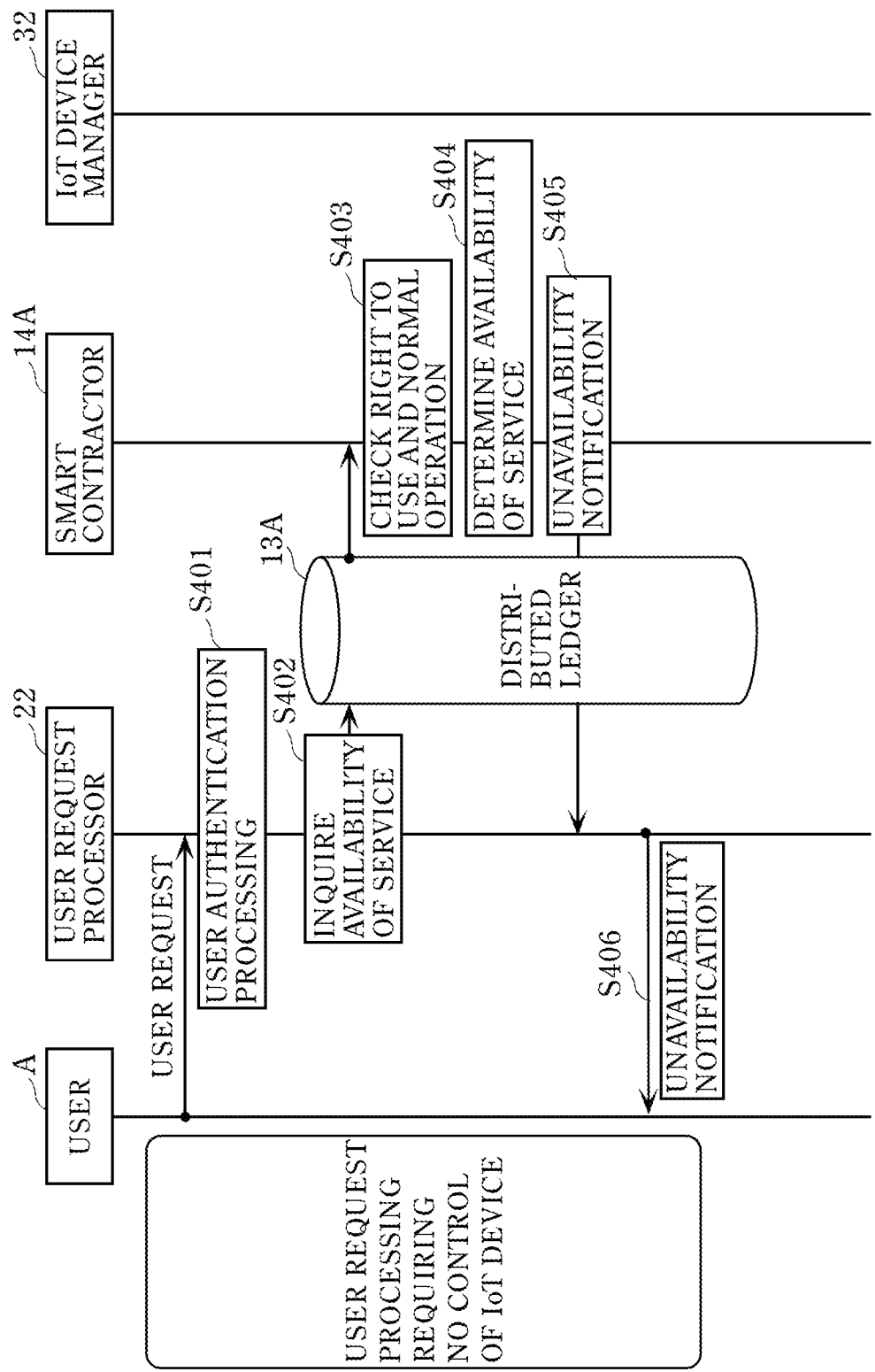

FIG. 18

| 0002 | ¥100 | disabled |
|------|------|----------| ized
CONTROL METHOD, CONTROL SYSTEM, FIRST SERVER, AND DATA STRUCTURE

CROSS REFERENCE TO RELATED APPLICATIONS

This application is a U.S. continuation application of PCT International Patent Application Number PCT/JP2019/041096 filed on Oct. 18, 2019, claiming the benefit of priority of U.S. Provisional Patent Application No. 62/747,303 filed on Oct. 18, 2018, the entire contents of which are hereby incorporated by reference.

BACKGROUND

1. Technical Field

The present disclosure relates to a control method, a control system, a first server, and a data structure.

2. Description of the Related Art

For example, the technique of managing the lock and unlock of units constituting a delivery locker using a blockchain is disclosed (see NPL 1: GMO Internet, Inc., "GMO Internet Group, SAISON INFORMATION SYSTEMS, and PARCO Collaborated Second Demonstration Experiment Utilizing Blockchain and IoT", [online], Jun. 21, 2017, searched on Oct. 25, 2018, website <URL: https://cloud.z-.com/jp/news-ep/IoT2/> (NPL) 1). A smart contract using a blockchain may be used for managing the lock and unlock of units constituting a delivery locker.

SUMMARY

In order to deliver a package to a delivery locker, a delivery company needs to purchase the right to use one or more units constituting the delivery locker and then move to the actual location of the units. When a delivery person tries to unlock the units for use after arriving at the location, the units may be malfunctioning and not operating.

In other words, with respect to an Internet of Things (IoT) device such as a delivery locker, the point to purchase the right to use is away from the location of the IoT device, that is, the actual point of use. Placed in physically different locations, a plurality of ledgers of a blockchain operate without being influenced by a disaster, for example, occurring in a point. On the other hand, an IoT device such as a delivery locker may be malfunctioning due to a disaster or deterioration and unavailable, when the device itself needs to operate. Accordingly, even if the right to use a certain IoT device is available for purchase on a system, the IoT device may be actually malfunctioning and unavailable in the location.

In this case, there is a need to search for an IoT device available on site and purchase the right to use again. If there is no other IoT device available on site, the delivery person needs to move to the location of an available IoT device. In this case, the movement to the malfunctioning IoT device is unnecessary extra work and a waste of time and energy.

The present disclosure was made in view of the circumstances described above. It is an objective of the present disclosure to provide a control method that employs a distributed ledger to further reduce the time and energy costs.

In order to achieve the objective, a control method according to an aspect of the present disclosure is executed by a first server of a plurality of servers in a system including one or more Internet of Things (IoT) devices and the plurality of servers communicative with the one or more IoT devices via a network. The control method includes: obtaining first transaction data including operation notification information and time information from each of the one or more IoT devices, the operation notification information including identification information on the IoT device and a notification indicating that the IoT device is operating, the time information indicating a time when the IoT device has obtained the operation notification information; transferring the first transaction data obtained, to a plurality of second servers that are the plurality of servers other than the first server; executing, together with the plurality of second servers, a first consensus algorithm for an agreement on an authenticity of the first transaction data; and recording a block containing the first transaction data in a distributed ledger of the first server, when the authenticity of the first transaction data is verified by the first consensus algorithm.

This general and specific aspect may be implemented using a system, a method, an integrated circuit, a computer program, or a computer-readable recording medium such as a CD-ROM, or any combination of systems, methods, integrated circuits, computer programs, or recording media.

The control method, for example, according to the present disclosure employs a distributed ledger to further reduce time and energy costs.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 9 is a flowchart showing a control method executed by the control system according to the embodiment;

FIG. 10 is a sequence diagram showing user request processing requiring no control of the IoT device according to the embodiment;

FIG. 11A shows an example data structure of transaction data used in the user request processing shown in FIG. 10;

FIG. 11B shows another example data structure of the transaction data used in the user request processing shown in FIG. 10;

FIG. 11C shows further another example data structure of the transaction data used in the user request processing shown in FIG. 10;

FIG. 13A shows an example data structure of transaction data used in the user request processing shown in FIG. 12;

FIG. 13B shows another example data structure of the transaction data used in the user request processing shown in FIG. 12;

FIG. 13C shows further another example data structure of the transaction data used in the user request processing shown in FIG. 12;

FIG. 15 shows an example data structure of transaction data used in the notification processing shown in FIG. 14;

FIG. 16A shows status information managed by the smart contractor according to the embodiment;

FIG. 16B shows another status information managed by the smart contractor according to the embodiment;

FIG. 17 is a sequence diagram showing another example user request processing requiring no control of the IoT device according to the embodiment;

FIG. 18 shows an example data structure of transaction data used in the user request processing shown in FIG. 17;

DETAILED DESCRIPTION OF THE EMBODIMENT

Figure 1:
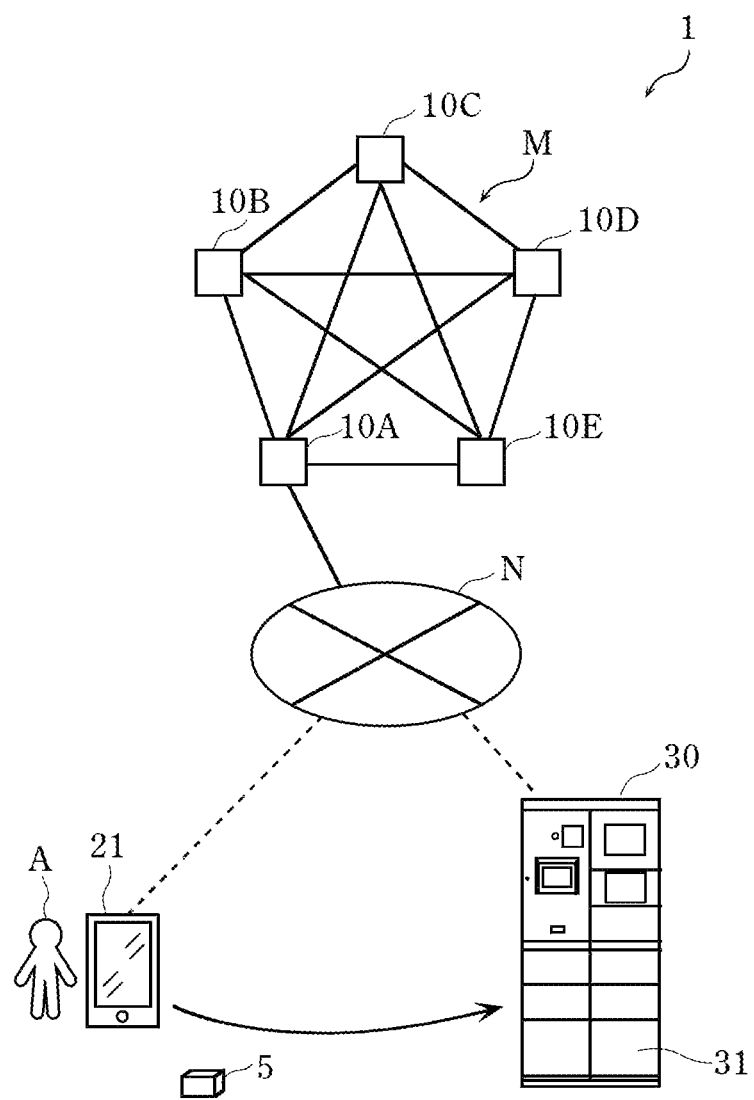
FIG. 1 is a block diagram schematically showing a configuration of a control system according to an embodiment.

A control method according to an aspect of the present disclosure is executed by a first server of a plurality of servers in a system including one or more Internet of Things (IoT) devices and the plurality of servers communicative with the one or more IoT devices via a network. The control method includes: obtaining first transaction data including operation notification information and time information from each of the one or more IoT devices, the operation notification information including identification information on the IoT device and a notification indicating that the IoT device is operating, the time information indicating a time when the IoT device has obtained the operation notification information; transferring the first transaction data obtained, to a plurality of second servers that are the plurality of servers other than the first server; executing, together with the plurality of second servers, a first consensus algorithm for an agreement on an authenticity of the first transaction data; and recording a block containing the first transaction data in a distributed ledger of the first server, when the authenticity of the first transaction data is verified by the first consensus algorithm.

This method allows periodical recording, in the distributed ledger, of the operation notification information including the fact that the IoT device is operating normally. If the difference between the current time and the time of obtaining the recent operation notification information is larger than or equal to a threshold, a malfunction of the IoT device can be determined. With this method, the user does not acquire the permission to use the malfunctioning IoT device in a place different from the actual location of the IoT device. As a result, there is no need for the user to actually move to the malfunctioning IoT device, causing no extra work or waste of time or energy for the movement. In this manner, the time and energy costs can be further reduced using the distributed ledger.

Here, for example, the system further includes a terminal communicative with the plurality of servers via the network and used by a user. The control method further includes: reading out status information indicating whether each of the one or more IoT devices is available based on whether the operation notification information has been obtained within a predetermined time, when a user request by the user inquiring whether an IoT device of the one or more IoT devices is available is received from the terminal; and sending, to the terminal, a first signal indicating that the IoT device is permitted for use under a predetermined condition, when the IoT device is determined to be available based on the status information read out.

With this method, the user cannot acquire the permission to use the malfunctioning IoT device in a place different from the actual location of the IoT device. Since the malfunctioning IoT device is unavailable, there is no need to actually move to the malfunctioning IoT device, causing no extra work or waste of time or energy for the movement. In this manner, the time and energy costs can be further reduced using the distributed ledger.

For example, the method further includes: sending, to the terminal, a signal indicating that the IoT device is not permitted for use, when the IoT device is determined to be unavailable based on the status information read out.

With this method, the user reliably acquires the permission to use an IoT device not malfunctioning in a place different from the actual location of the IoT device.

For example, the method further includes: transferring, to the plurality of second servers, second transaction data indicating a purchase of a right to use the IoT device, when the second transaction data is obtained from the terminal; executing, together with the plurality of second servers, a second consensus algorithm for an agreement on an authenticity of the second transaction data; and recording a block containing the second transaction data in the distributed ledger of the first server, when the authenticity of the second transaction data is verified by the second consensus algorithm.

With this method, the acquisition of the permission to use the IoT device, that is, the purchase of the right to use the IoT device can be recorded as the history in the distributed ledger. The purchase of the right to use the IoT device is open to the public and falsification becomes detectable, which reduces fraud use of the right to use the IoT device.

For example, the status information further includes an open/closed status of the IoT device. The control method further includes: obtaining, from the terminal, third transaction data indicating a request to unlock the IoT device based on the right to use; transferring the third transaction data obtained, to the plurality of second servers; executing, together with the plurality of second servers, a third consensus algorithm for an agreement on an authenticity of the third transaction data; and recording a block containing the third transaction data in the distributed ledger of the first server to change the open/closed status of the IoT device included in the status information, when the authenticity of the third transaction data is verified by the third consensus algorithm.

This method allows recording of the history of the lock and unlock of the IoT device in the distributed ledger. The history of the lock and unlock of the IoT device is open to the public and falsification becomes detectable, which reduces fraud use of the right to use the IoT device.

For example, the method further includes: reading out the first transaction data recorded in the distributed ledger; generating the status information based on the first transaction data read out, and writing the status information on a memory of the first server; and reading out the status information on the memory, when the user request is received from the terminal.

This method allows determination on whether the IoT device is available by reading out the status information written on the memory of the first server, without searching for the first transaction data recorded in the distributed ledger. This further reduces the time and energy for searching the distributed ledger to obtain the status information. In this manner, the time and energy costs can be further reduced using the distributed ledger.

For example, the time information is a timestamp at a time of obtaining the operation notification information or a sequence number.

For example, the method further includes: executing a smart contract stored in the distributed ledger to generate the first transaction data, when the operation notification information is obtained.

This method allows establishment of the mechanism of periodically recording, in the distributed ledger, the operation notification information including the fact that the IoT device is operating normally, using the smart contract stored in the distributed ledger.

A control system according to an aspect of the present disclosure includes: one or more IoT devices; and a plurality of servers communicative with the one or more IoT devices via a network. A first server of the plurality of servers: obtains first transaction data including operation notification information and time information from each of the one or more IoT devices, the operation notification information including identification information on the IoT device and a notification indicating that the IoT device is operating, the time information indicating a time when the IoT device has obtained the operation notification information; transfers the first transaction data obtained, to a plurality of second servers that are the plurality of servers other than the first server; executes, together with the plurality of second servers, a first consensus algorithm for an agreement on an authenticity of the first transaction data; and records a block containing the first transaction data in a distributed ledger of the first server, when the authenticity of the first transaction data is verified by the first consensus algorithm.

A first server according to an aspect of the present disclosure is one of a plurality of servers in a system including one or more IoT devices and the plurality of servers communicative with the one or more IoT devices via a network. The first server includes: a processor; a memory that stores a program causing the processor to execute processing; and a storage device that stores a distributed ledger storing a smart contract. The processor executes the smart contract stored in the distributed ledger to obtain first transaction data including operation notification information and time information from each of the one or more IoT devices, the operation notification information including identification information on the IoT device and a notification indicating that the IoT device is operating, the time information indicating a time when the IoT device has obtained the operation notification information. By executing the program stored on the memory, the processor: transfers the first transaction data obtained, to a plurality of second servers that are the plurality of servers other than the first server; executes, together with the plurality of second servers, a first consensus algorithm for an agreement on an authenticity of the first transaction data; and records a block containing the first transaction data in the distributed ledger of the first server, when the authenticity of the first transaction data is verified by the first consensus algorithm.

A data structure according to an aspect of the present disclosure is used for a block to be recorded in a distributed ledger, in a system including one or more IoT devices and a plurality of servers communicative with the one or more IoT devices via a network. The data structure includes: first transaction data including operation notification information and time information. The operation notification information includes identification information on each of the one or more IoT devices and a notification indicating that the IoT device is operating. The time information indicating a time of obtaining the operation notification information. The first transaction data is obtained by a first server of the plurality of servers through execution of a smart contract stored in the distributed ledger. The first transaction data obtained is contained in the block so as to be recorded in the distributed ledger.

Now, an embodiment will be described with reference to the drawings. Note that the embodiment described below is a preferred specific example of the present disclosure. That is, the numerical values, shapes, materials, constituent elements, the arrangement and connection of the constituent elements, steps, step orders etc. shown in the following embodiment are thus mere examples, and are not intended to limit the scope of the present disclosure.

The present disclosure is specified based on the claims. Among the constituent elements in the following embodiment, those not recited in any of the independent claims defining the broadest concept of the present disclosure are not necessarily essential to achieve the objective of the present disclosure but will be described as constituent elements forming a more preferred embodiment.

Embodiment

Control system 1 according to the embodiment will be described hereinafter with reference to the drawings.

Configuration of Control System 1

Control system 1 according to the present disclosure has the following mechanism. Using a smart contract stored in a distributed ledger, the control system periodically records, in the distributed ledger, operation notification information including the fact that an IoT device is operating normally. The control system determines whether the IoT device is malfunctioning utilizing blockchain techniques.

FIG. 1 is a block diagram schematically showing a configuration of control system 1 according to this embodiment.

As shown in FIG. 1, control system 1 includes servers 10A, 10B, . . . , and 10E, terminal 21, and one or more IoT devices 30. These are connected via network N. Note that servers 10A, 10B, . . . , and 10E will be referred to as "server 10A and the other servers". Each of server 10A and the other servers will also be referred to as "server 10". While an example is shown in FIG. 1 where control system 1 includes five servers 10, the configuration is not limited thereto. That is, control system 1 may include six or more servers 10.

Server 10A Since servers 10A, 10B, . . . , and 10 have the same configuration, server 10A will be described below as an example.

Figure 2:
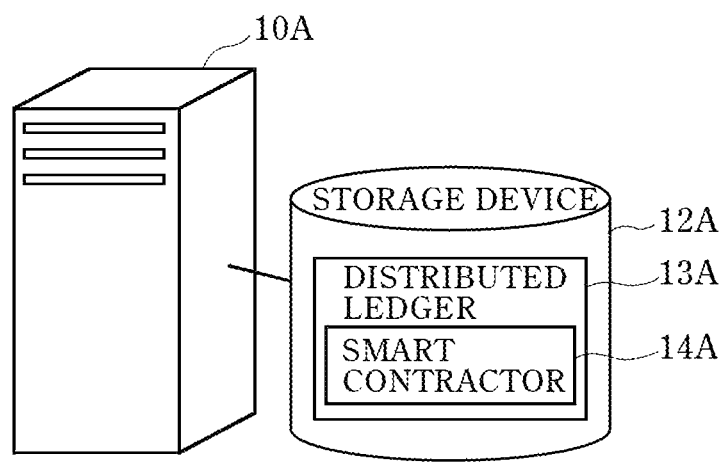
FIG. 2 schematically shows an example overall configuration of a server shown in FIG. 1.
Figure 3:
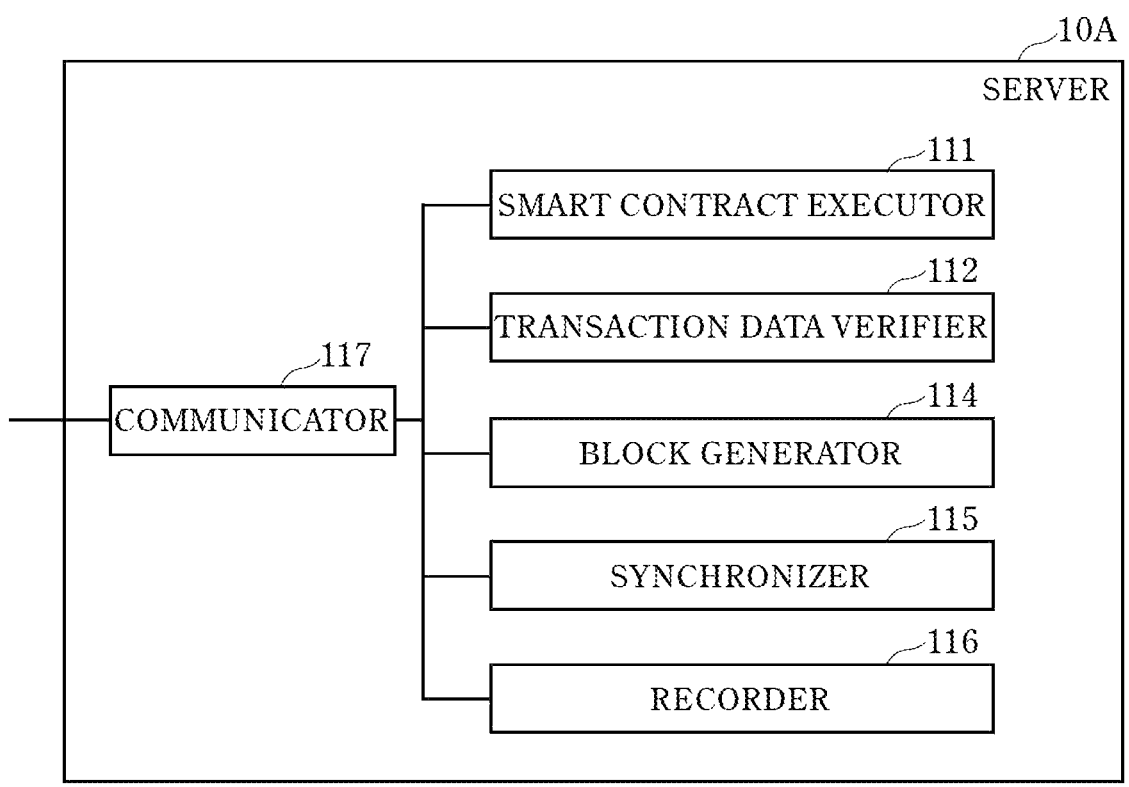
FIG. 3 is a block diagram showing a functional configuration of the server according to the embodiment.

FIG. 2 schematically shows an example overall configuration of server 10A shown in FIG. 1. FIG. 3 is a block diagram showing a functional configuration of server 10A according to this embodiment.

As shown in FIG. 2, server 10A is connected to storage device 12A. Note that server 10A may be connected to storage device 12A via network N, or may include storage device 12A inside. Storage device 12A may include distributed ledger 13A storing smart contractor 14A, which will be described later.

Server 10A is an example of the "first server". In this embodiment, server 10A includes, as shown in FIG. 3, smart contract executor 111, transaction data verifier 112, block generator 114, synchronizer 115, recorder 116, and communicator 117. Server 10A is operated by a processor executing predetermined programs in a memory. The constituent elements will be described below.

Smart Contract Executor 111

Smart contract executor 111 executes contract codes, for example, stored in distributed ledger 13A to operate smart contractor 14A. Smart contract executor 111 operates smart contractor 14A to manage the purchasing and selling of the right to use IoT device 30 and the lock and unlock of the device using distributed ledger 13A.

In this embodiment, smart contract executor 111 causes smart contractor 14A to execute processing. For example, smart contract executor 111 causes smart contractor 14A to obtain the first transaction data. Here, the first transaction data includes, for example, operation notification information and time information that are obtained by each of the one or more IoT devices. The operation notification information includes identification information on the IoT device and a notification indicating that the IoT device is operating. The time information indicates the time when the IoT device has obtained the operation notification information. The time information may be a timestamp at the time of obtaining the operation notification information or a sequence number.

As a result of operating smart contractor 14A, smart contract executor 111 may hold the obtained information on a memory of server 10A. In other words, as a result of operating smart contractor 14A, smart contract executor 111 may read out the information recorded in distributed ledger 13A, and write and hold the information on the memory of server 10A.

Note that smart contract executor 111 may read out the first transaction data recorded in distributed ledger 13A and generate, based on the read-out first transaction data, status information indicating whether IoT device 30 is available. Smart contract executor 111 may write the generated status information on the memory of the first server. Smart contract executor 111 may write and hold, on the memory, the presence or absence of the right to use IoT device 30 and the information indicating the open/closed status of IoT device 30.

Transaction Data Verifier 112

Receiving the transaction data, transaction data verifier 112 verifies the authenticity of the received transaction data.

In this embodiment, transaction data verifier 112 receives, from smart contract executor 111, the first transaction data including the operation notification information and the time information. The operation notification information includes the identification information on one or more IoT devices and the notification indicating that the IoT device is operating. The time information indicates the time of obtaining the operation notification information. Transaction data verifier 112 verifies an electronic signature included in the received first transaction data to verify the authenticity of the first transaction data. Receiving second transaction data indicating the purchase of the right to use one of IoT devices 30, transaction data verifier 112 verifies an electronic signature included in the second transaction data to verify the authenticity of the second transaction data. Similarly, receiving third transaction data indicating a request to unlock the one of IoT devices 30, transaction data verifier 112 verifies an electronic signature included in the third transaction data to verify the authenticity of the third transaction data.

In this manner, transaction data verifier 112 verifies the obtained transaction data. Confirming the authenticity of the transaction data as a result of the verification, transaction data verifier 112 records the transaction data in recorder 116 and notifies synchronizer 115.

Note that transaction data verifier 112 may not verify the authenticity of transaction data, if transaction data generator 113 generates the transaction data.

Block Generator 114

Block generator 114 executes, together with second servers (i.e., servers 10B to 10E) different from the first server, a consensus algorithm for an agreement on the authenticity of the transaction data.

The consensus algorithm here corresponds to first to third consensus algorithms. Specifically, the first to third consensus algorithms are the same consensus algorithm executed at different times. The transaction data here corresponds to the first to the third transaction data.

In this manner, block generator 114 executes the consensus algorithm among a plurality of authentication servers. The consensus algorithm may be the one called "practical Byzantine Fault Tolerance (pBFT)" or any other known consensus algorithm. A known consensus algorithm may be Proof of Work (PoW) or Proof of Stake (POS), for example. If the PBFT is employed, block generator 114 first receives from each of other authentication servers 200b and 200c, a report on whether the transaction has been successfully verified, and determines whether the number of the reports exceeds a predetermined number. If the number of the reports exceeds the predetermined number, block generator 114 may determine that the authenticity of the transaction data has been verified by the consensus algorithm.

If the authenticity of the transaction data has been verified by the consensus algorithm, block generator 114 records a block containing the transaction data in the distributed ledger of storage device 12A of server 10A.

In this manner, in this embodiment, block generator 114 executes the consensus algorithm among servers 10A to 10E. More specifically, block generator 114 first generates a block of a block chain containing one or more pieces of transaction data. Next, block generator 114 executes the consensus algorithm. Arriving an agreement as a result of executing the consensus algorithm, block generator 114 records the generated block in recorder 116. The block generated by block generator 114 is connected to the blockchain stored in distributed ledger 13A by recorder 116 and recorded.

Now, data structures of the blockchain and the transaction data will be described.

Figure 4:
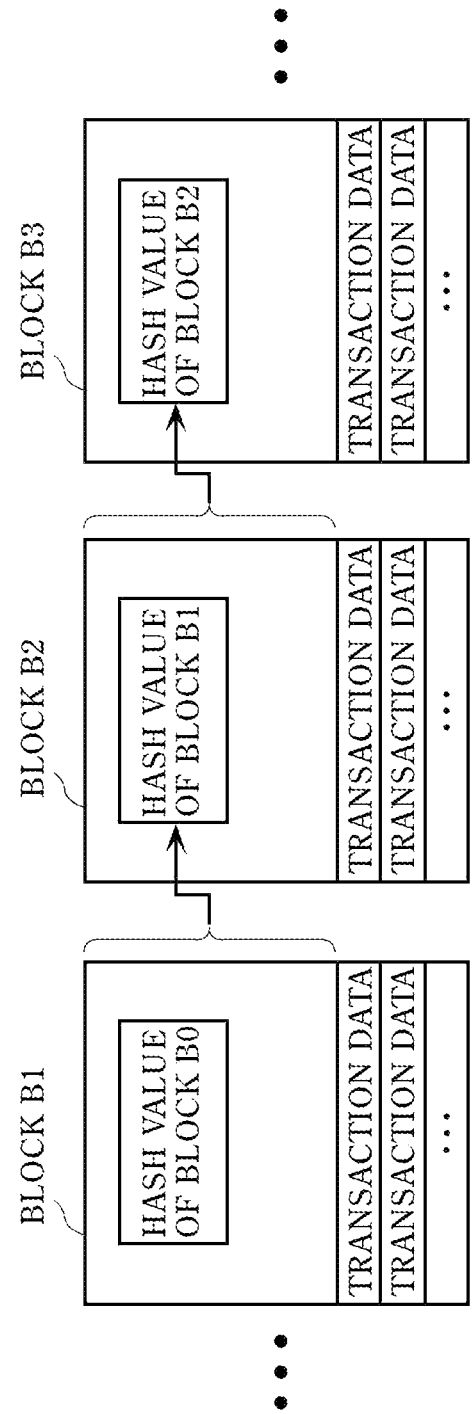
FIG. 4 is an illustration showing a data structure of a blockchain.

FIG. 4 is an illustration showing a data structure of the blockchain.

The blockchain is obtained by connecting blocks, as units of recording, in a chain. Each block has a plurality of transaction data and the hash value of the immediately preceding block. Specifically, block B2 includes the hash value of preceding block B1. Then, the plurality of transaction data contained in block B2 and the hash value calculated from the hash value of block B1 are, as the hash value of block B2, included in block B3. In this manner, the blocks are connected in a chain, while including the contents of the preceding blocks as the hash values, to effectively reduce the falsification of the connected transaction data.

If past transaction data has been changed, the block has a hash value different from the one before the change. In order to make the falsified block look as if it were authentic, all the succeeding blocks need to be generated again. This is an extremely hard work in practice.

Figure 5:
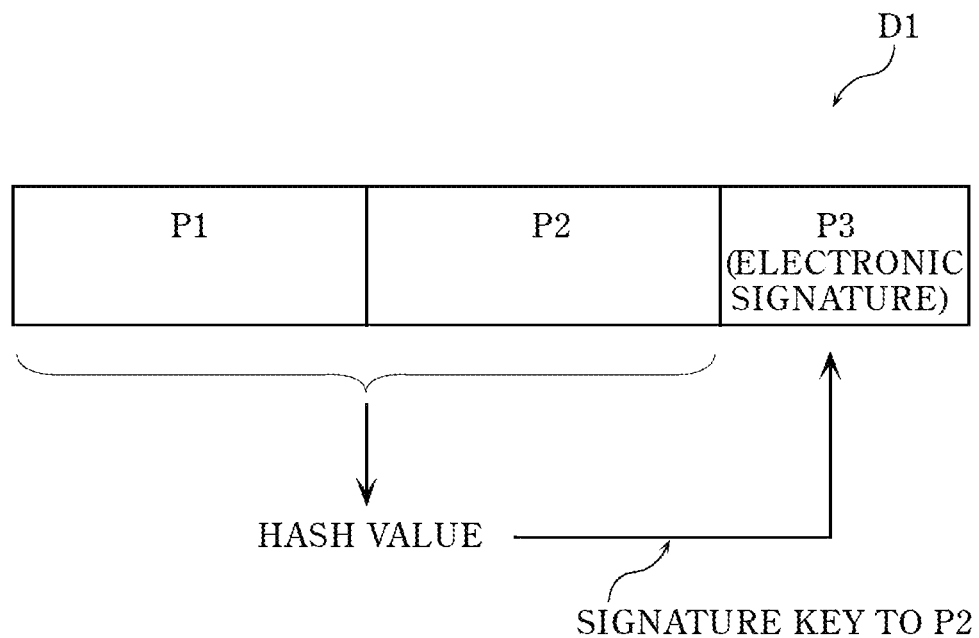
FIG. 5 is an illustration showing a data structure of transaction data.

FIG. 5 is an illustration showing a data structure of the transaction data.

Transaction data D1 shown in FIG. 5 is an example of the "first transaction data" to the "third transaction data". Transaction data D1 includes P1, P2, and P3. P1 indicates a requester such as user A. Address P2 indicates a smart contract address, a function name, and an argument. Electronic signature P3 is generated for the hash values of addresses P1 and P2 by the requester signing with a signature key. While the smart contract address, the function name, and the argument are written, for example, in the JSON, the configuration is not limited thereto. The smart contract address is an address of the smart contract that is a program for contracts.

Synchronizer 115

Synchronizer 115 synchronizes the blocks of the blockchain or the transaction data among the plurality of servers (i.e., servers 10A to 10E).

In this embodiment, if the first to third transaction data have been successfully verified, synchronizer 115 transfers copies of the first to third transaction data to the other servers (i.e., servers 10B to 10E).

Among the plurality of servers (i.e., servers 10A to 10E), the transaction data of the blockchain is synchronized on a peer-to-peer basis. Then, synchronizer 115 records the synchronized transaction data of the blockchain in recorder 116.

For example, verifying the authenticity of the first transaction data, synchronizer 115 transfers the contents of the first transaction data to the other servers (i.e., servers 10B to 10E). Synchronizer 115 records the verified first transaction data in recorder 116.

For example, receiving the first transaction data from another server (i.e., any of servers 10B to 10E), synchronizer 115 records the first transaction data in recorder 116. Note that this also applies to the second and third transaction data and the description thereof will thus be omitted.

Recorder 116

Recorder 116 records, in distributed ledger 13A of storage device 12A, the block containing the transaction data. In this embodiment, recorder 116 records a block containing the first transaction data in distributed ledger 13A of server 10A, when the authenticity of the first transaction data is verified by the first consensus algorithm. Note that this also applies to the second and third transaction data and the description thereof will thus be omitted.

Communicator 117

Communicator 117 communicates with terminal 21. IoT devices 30, and other servers 10 (i.e., servers 10B to 10E). More specifically, communicator 117 is a communication interface that communicates with terminal 21, IoT devices 30, and other servers 10 (i.e., servers 10B to 10E). The communications with terminal 21, IoT devices 30, and other servers 10 (i.e., servers 10B to 10E) may be made by the TLS. In this case, cryptographic keys for the TLS communications may be held by communicator 117.

Configuration of Storage Device 12A

Storage device 12A includes distributed ledger 13A for managing the purchasing and selling the right to use IoT device 30 and the lock and unlock of IoT device 30. Storage device 12A is a hard disk drive (HDD) or a solid-state drive (SSD), for example.

Distributed ledger 13A electronically records the transaction data and blocks of the blockchain. Distributed ledger 13A also stores smart contractor 14A that is a program. Storage device 12A stores program codes called "contract codes", for example, and executes these contract codes to execute smart contractor 14A.

Configuration of Smart Contractor 14A

Figure 6:
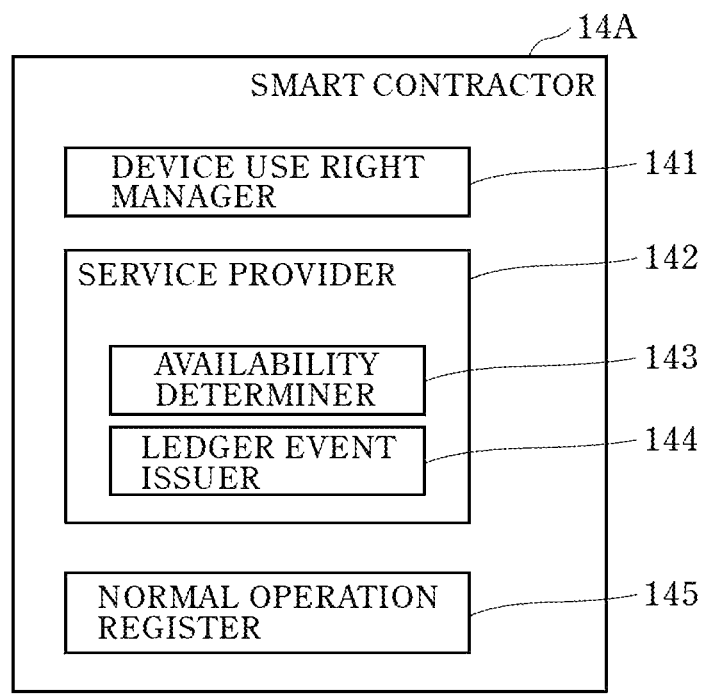
FIG. 6 is a block diagram showing a functional configuration of a smart contractor according to the embodiment.

FIG. 6 is a block diagram showing a functional configuration of smart contractor 14A according to this embodiment.

As shown in FIG. 6, smart contractor 14A includes device use right manager 141, service provider 142, and normal operation register 145.

Device Use Right Manager 141

Device use right manager 141 manages the right to use IoT device 30. In this embodiment, receiving an inquiry as to whether target IoT device 30 is available as a user request from terminal 21, device use right manager 141 checks the latest status of the right to use this IoT device 30 recorded in distributed ledger 13A. Device use right manager 141 checks whether the right to use target IoT device 30 is available for purchase or whether user A of terminal 21 has purchased the right to use target IoT device 30 in accordance with the inquiry, and notifies service provider 142.

Service Provider 142

Service provider 142 includes availability determiner 143 and ledger event issuer 144.

Availability determiner 143 determines whether the request was made by user A who has the right to use target IoT device 30, and whether the service of target IoT device 30 is available.

More specifically, assume that availability determiner 143 receives, from terminal 21, a user request by user A inquiring whether one of IoT devices 30 is available. In this case, availability determiner 143 reads out the status information indicating whether the one of IoT devices 30 is available, based on whether the operation notification information has been obtained within a predetermined time. Note that "within a predetermined time" corresponds to the case where the difference between the current time and the time of obtaining the recent operation notification information is smaller than a threshold. The status information may be held on a memory, namely, the memory of server 10A. In this case, receiving the user request from terminal 21, availability determiner 143 may read out the status information on the memory of server 10A.

Determining that the one of IoT devices 30 is available based on read-out status information, availability determiner 143 sends, to terminal 21, a first signal indicating that the one of IoT devices 30 is permitted for use under predetermined conditions. On the other hand, determining that the one of IoT devices 30 is unavailable, based on the read-out status information, availability determiner 143 sends, to terminal 21, a signal indicating that the one of the IoT devices is not permitted for use.

In this embodiment, receiving the user request, availability determiner 143 reads out the status information obtainable from the first transaction data recorded in distributed ledger 13A or on a memory, to check whether target IoT device 30 is malfunctioning. As described above, whether target IoT device 30 is malfunctioning may be checked based on whether the operation notification information has been obtained from target IoT device 30 within the predetermined time.

Availability determiner 143 determines whether target IoT device 30 is available based on the latest status of the right to use notified by device use right manager 141 and on whether target IoT device 30 is malfunctioning.

Determining that target IoT device 30 is available, availability determiner 143 sends an availability notification to terminal 21. Depending on the user request, the availability notification indicates that target IoT device 30 is available and the right to use is available for purchase, or user A of terminal 21 has purchased the right to use target IoT device 30 and this IoT device 30 is available.

On the other hand, determining that target IoT device 30 is unavailable, availability determiner 143 sends a signal as an unavailability notification to terminal 21. Depending on the user request, the unavailability notification indicates that another user has purchased the right to use target IoT device 30 and the device is thus unavailable, or that target IoT device 30 is malfunctioning and is thus unavailable.

Ledger event issuer 144 issues a ledger event necessary for providing service. In this embodiment, receiving (or obtaining) transaction data on a request to lock/unlock IoT device 30 from terminal 21, ledger event issuer 144 changes the lock/unlock status of IoT device 30 recorded in distributed ledger 13A. More specifically, receiving the transaction data on the request for the lock/unlock, ledger event issuer 144 sends the data to server 10A. Then, server 10A synchronizes the block containing the transaction data on the request for the lock/unlock with the consensus algorithm, and then records the block in distributed ledger 13A to change the status on distributed ledger 10A. Here, the transaction data on the request for the lock/unlock includes a contract address, and a function and an argument for lock/unlock processing set to P2 shown in FIG. 5, for example, in the JSON.

In this embodiment, ledger event issuer 144 changes the lock/unlock status of target IoT device 30 held on a memory, for example. For example, ledger event issuer 144 changes the lock/unlock status of target IoT device 30 held on the memory from locked to unlocked.

Receiving the transaction data indicating the change in the lock/unlock status from target IoT device 30, ledger event issuer 144 may cause distributed ledger 13A to record the transaction data.

Receiving, from terminal 21, the transaction data indicating that user A has purchased the right to use target IoT device 30, ledger event issuer 144 may cause distributed ledger 13A to record the transaction data.

Normal Operation Register 145

Normal operation register 145 records, in distributed ledger 13A, the operation notification information notified by IoT device 30 itself and the time information indicating the time of obtaining the operation notification information. The operation notification information and the time information are used for the determination on whether IoT device 30 is malfunctioning at the time of providing the service.

In this embodiment, obtaining, from at least one IoT device 30, the operation notification information including a notification indicating that the IoT device itself is operating normally, normal operation register 145 checks whether the operation notification information is notified by this IoT device 30 itself based on an electronic signature, for example. Confirming that the operation notification information is notified by IoT device 30 itself, normal operation register 145 updates the status information on this IoT device 30 on the memory.

Note that normal operation register 145 may receive, from at least one IoT device 30, the first transaction data including the notified operation notification information, and the time information indicating the time of obtaining the operation notification information. In this case, normal operation register 145 sends the received first transaction data to server 10A and causes server 10A to record distributed ledger 13A. In this manner, normal operation register 145 registers, in distributed ledger 13A, the fact that at least one IoT device 3 is operating normally.

IoT Device 30

IoT devices 30 is a delivery locker, a car for sharing, a motorcycle for sharing, or a hotel room, for example. IoT device 30 is however not limited thereto. Any device is also applicable, as long as the point where user A tries to acquire the permission to use is away from the actual point of use. Each IoT device 30 is available for a person who is authorized to use, that is, to lock and unlock (i.e., who has the right to use) IoT device 30. Each device is available for, for example, a single person who is authorized to lock and unlock (i.e., who has the right to use) the device, but may be available for two or more people.

For example, as shown in FIG. 1, IoT device 30 is a delivery locker including one or more units 31 for storing article 5. Each unit 31 is a space for temporarily storing article 5 and used for passing article 5 from user A to another user.

Note that IoT device 30 is controlled to be locked or unlocked under the smart contract among server 10A and the other servers. IoT device 30 has the functions of periodically determining that the device itself is operating normally, and notifying server 10A that the device is operating normally, in addition to the function of controlling the device itself. These functions, namely, the function of controlling the device itself, the determination function, and the notification function are executed by a program (hereinafter referred to as IoT device manager 32) recorded in IoT device 30.

Configuration of IoT Device Manager 32

Figure 7:
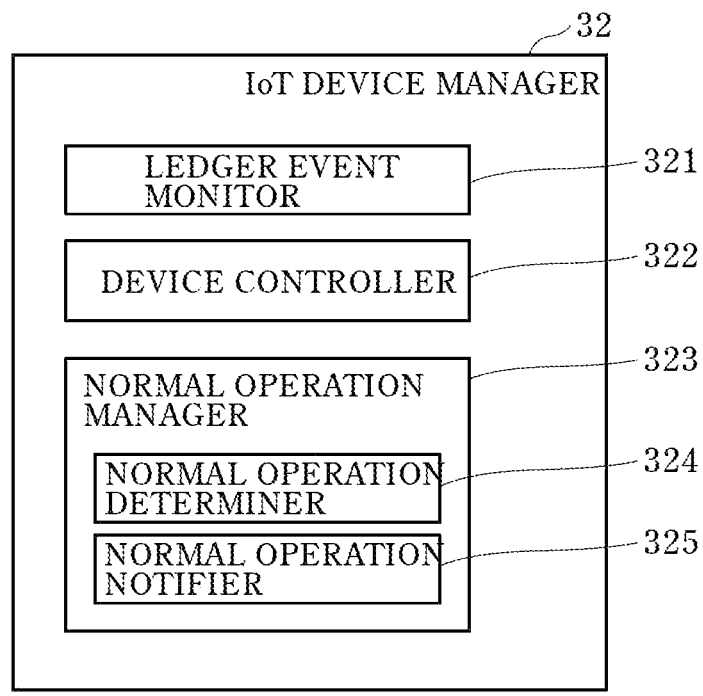
FIG. 7 is a block diagram showing a functional configuration of an IoT device manager according to the embodiment.

FIG. 7 is a block diagram showing a functional configuration of IoT device manager 32 according to this embodiment.

As shown in FIG. 7, IoT device manager 32 includes ledger event monitor 321, device controller 322, and normal operation manager 323.

Ledger Event Monitor 321

Ledger event monitor 321 monitors events recorded in distributed ledger 13A to obtain the events issued by smart contractor 14A. These events include the transaction data.

In this embodiment, ledger event monitor 321 monitors the lock/unlock status of IoT device 30 held on a memory. Once the lock/unlock status of one of IoT devices 30 held on the memory changes, ledger event monitor 321 obtains the lock/unlock status of the one of IoT devices 30 as a type of the event issued by smart contractor 14A. Alternatively, based on the obtained event type, ledger event monitor 321 may instruct device controller 322 to bring the one of IoT devices 30 into the lock/unlock status as changed.

Note that ledger event monitor 321 may monitor distributed ledger 13A using smart contractor 14A. For example, assume that transaction data indicating the change in the lock/unlock status of target IoT device 30 is recorded in distributed ledger 13A. In this case, ledger event monitor 321 may obtain the fact as the type of the event issued by smart contractor 14A. Based on the obtained event type, ledger event monitor 321 may instruct device controller 322 to bring target IoT device 30 into the lock/unlock status as recorded in distributed ledger 13A.

Device Controller 322

Device controller 322 controls IoT device 30 based on the event type obtained by ledger event monitor 321.

In this embodiment, device controller 322 controls the lock and unlock of target IoT device 30 based on the lock/unlock status of target IoT device 30 changed on the memory, or newly recorded in distributed ledger 13A. Device controller 322 may control the lock and unlock of target IoT device 30 based on the instruction by ledger event monitor 321.

After controlling the lock and unlock of target IoT device 30, device controller 322 may generate transaction data indicating the fact and send the transaction data to server 10A. In this case, the transaction data includes unlock information indicating the unlock of target IoT device 30 and time information indicating the time of obtaining the unlock information.

In this manner, device controller 322 unlocks the IoT device, for example, when smart contractor 14A has obtained a request to unlock the IoT device based on the right to use target IoT device.

Normal Operation Manager 323

Normal operation manager 323 includes normal operation determiner 324 and normal operation notifier 325.

Normal operation determiner 324 periodically determines that IoT device 30 is operating normally. In this embodiment, normal operation determiner 324 checks the operation of IoT device 30 at each predetermined time period to determine that IoT device 30 is operating normally.

Normal operation notifier 325 utilizes normal operation register 145 of smart contractor 14A recorded in distributed ledger 13A to notify that IoT device 30 is operating normally. In this embodiment, once normal operation determiner 324 determines that IoT device 30 is operating normally, normal operation notifier 325 sends the first transaction data to normal operation register 145 of smart contractor 14A. As described above, the first transaction data includes the operation notification information notified by at least one IoT device 30, and the time information indicating the time of obtaining the operation notification information. Note that normal operation notifier 325 may send, to normal operation register 145 of smart contractor 14A the first transaction data including identification information such as identification number of this IoT device 30.

Terminal 21

Terminal 21 is communicative with the plurality of servers 10 (i.e., servers 10A, 10B, ..., and 10E) via network N and used by user A. Terminal 21 may be a smartphone or a personal computer, for example.

Terminal 21 receives, from a user, instructions to obtain the right to use IoT device 30 or to unlock or lock the device, and sends information on the instructions as a user request to server 10A, for example. FIG. 1 shows that user A tries to use, through terminal 21, one of units 31 of IoT device 30 that is a delivery locker to pass article 5 to another user.

In terminal 21, the function of receiving the instructions from user A, or the function of personal authentication of user A for sending the user request to server 10A is executed by a program (hereinafter referred to as user request processor 22) recorded in terminal 21.

Configuration of User Request Processor 22

Figure 8:
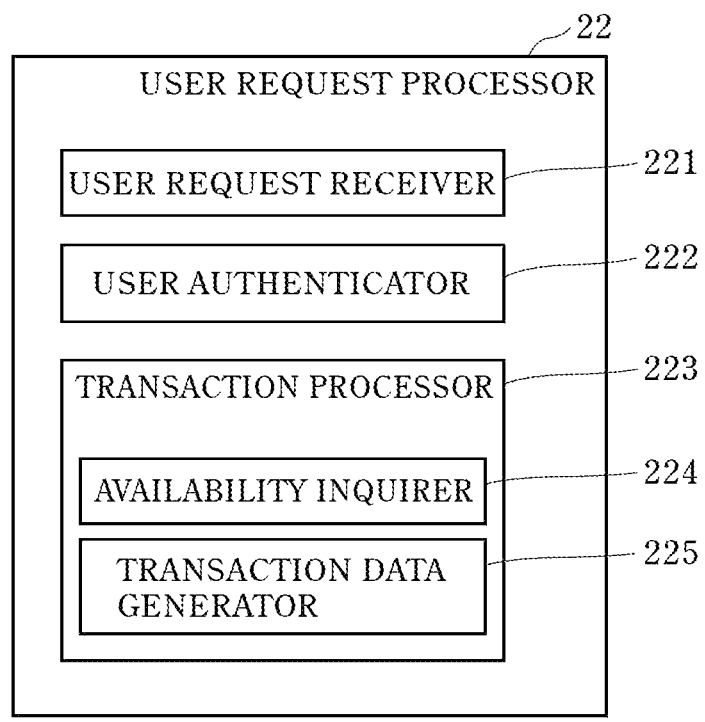
FIG. 8 is a block diagram showing a functional configuration of a user request processor according to the embodiment.

FIG. 8 is a block diagram showing a functional configuration of user request processor 22 according to this embodiment.

As shown in FIG. 8, user request processor 22 includes user request receiver 221, user authenticator 222, and transaction data processor 223.

User Request Receiver 221

User request receiver 221 receives a user request to unlock IoT device 30, for example.

In this embodiment, user request receiver 221 receives a user request indicating an inquiry as to whether target IoT device 30 is available, or a request to unlock target IoT device 30. Besides, the user request may be an inquiry as to whether user A has the right to use target IoT device 30.

User Authenticator 222

User authenticator 222 performs the personal authentication of the user who is making the user request.

In this embodiment, user authenticator 222 performs the personal authentication of user A who has made the user request to verify the authenticity of the user request received by user request receiver 221

Transaction Data Processor 223

Transaction data processor 223 includes availability inquirer 224 and transaction data generator 225.

Availability inquirer 224 inquires whether transaction data according to the user request is acceptable. In this embodiment, availability inquirer 224 inquires whether target IoT device 30 is available and whether the request to unlock target IoT device 30 is acceptable. Note that this inquiry may be made by generating transaction data including the information indicating the requester, the information indicating the inquiry, and identification information such as the identification number of IoT device 30 to be inquired, and sending the transaction data to smart contractor 14A.

Transaction data generator 225 issues, to distributed ledger 13A, the transaction data according to the user request. Note that the transaction data according to the user request is encrypted by a private key of user A which allows the personal authentication of user A.

In this embodiment, transaction data generator 225 may generate transaction data indicating an inquiry. Transaction data generator 225 may generate transaction data indicating a purchase of the right to use one of IoT devices 30. Transaction data generator 225 may generate transaction data indicating a request to unlock target IoT device 30 as a user request to unlock target IoT device 30.

Control Method according to Present Disclosure

Now, an outline of a control method performed by control system 1 will be described.

FIG. 9 is a flowchart showing the control method executed by control system 1 according to this embodiment.

As shown in FIG. 9, first, a first server such as server 10A of control system 1 checks whether first transaction data has been obtained from each of one or more IoT devices 30 (S12). Here, as described above, the first transaction data includes the operation notification information on one or more IoT devices 30, and the time information indicating the time when one or more IoT devices 30 have obtained the operation notification information.

In step S12, obtaining the first transaction data from each of one or more IoT devices 30 (Yes in S12), the first server transfers the obtained first transaction data to a plurality of second servers of the plurality of servers 10 other than the first server (S13).

Next, the first server executes, together with the second servers, the first consensus algorithm for an agreement on the authenticity of the first transaction data (S14).

Next, if the authenticity of the first transaction data has been verified by the first consensus algorithm (Yes in S15), the first server records the block containing the first transaction data in the distributed ledger of the first server (S16).

If the authenticity of the first transaction data has not been verified by the first consensus algorithm (No in S15), the first server ends the processing.

Now, a specific aspect of the control method performed by control system 1 will be described. An example will be described hereinafter where IoT device 30 is a delivery locker including three units 31 assigned with ID0001 to ID0003.

User Request Processing Requiring No Control of IoT Device 30 FIG. 10 is a sequence diagram showing user request processing requiring no control of IoT device 30 according to this embodiment. FIGS. 11A and 11C show example data structures of transaction data used in the user request processing shown in FIG. 10. FIG. 11B shows an example data structure of the availability notification used in the user request processing shown in FIG. 10. An example will be described with reference to FIG. 10 where target IoT device 30 (i.e., for use) is not malfunctioning and the right to use target IoT device 30 is available for purchase.

As shown in FIG. 10, first, user A makes, to terminal 21, a user request for permission to use unit 31 with ID0002 of IoT device 30, for example. Then, user request processor 22 of terminal 21 receives the user request and performs the processing of authenticating user A who has made the user request (S101).

Next, if user A has been successfully authenticated in step S101, user request processor 22 makes an inquiry to distributed ledger 13A whether unit 31 with ID0002 is available (S102). In this embodiment, user request processor 22 issues, to distributed ledger 13A, the transaction data with the data structure shown in FIG. 11A to operate smart contractor 14A. FIG. 11A shows the transaction data with the data structure including "usrA" indicating that user A is the requester, "0002" indicating the identification information on unit 31 with ID0002, and "query_reserve" indicating the inquiry as to whether unit 31 with ID0002 is available. In FIG. 11A, whether the right to use unit 31 with ID0002 has been purchased is inquired as the inquiry as to whether unit 31 with ID0002 is available.

Then, smart contractor 14A checks the latest status in distributed ledger 13A to check the status of the right to use unit 31 with ID0002 and whether unit 31 with ID0002 is operating normally (S103).

After that, smart contractor 14A determines whether the service of unit 31 with ID0002 is available based on the checked status of the right to use unit 31 with ID0002 and the fact that unit 31 with ID0002 is operating normally (S104). Here, since the right to use unit 31 with ID0002 is available for purchase and unit 31 with ID0002 is operating normally, smart contractor 14A determines that unit 31 with ID0002 is available.

Determining that unit 31 with ID0002 is available, smart contractor 14A sends the availability notification to user request processor 22 of terminal 21 (S105). In this embodiment, smart contractor 14A sends the availability notification with the data structure shown in FIG. 11B to user request processor 22. FIG. 11B shows the data structure of the availability notification including "0002" indicating the identification information on unit 31 with ID0002, "Not use" indicating that unit 31 with ID0002 is not used, and "¥100" indicating the amount to purchase the right to use.

Then, user request processor 22 issues, to distributed ledger 13A, the transaction data indicating a purchase of the right to use unit 31 with ID0002 (S106). In this embodiment, user request processor 22 generates transaction data with the data structure shown in FIG. 11C and sends the transaction data to distributed ledger 13A to operate smart contractor 14A. FIG. 11C shows the transaction data with the data structure including "usrA" indicating that user A is the requester, "0002" indicating the identification information on unit 31 with ID0002, and "reserve" indicating a reservation, that is, a purchase of the right to use unit 31 with ID0002.

After that, smart contractor 14A performs service processing of issuing, to distributed ledger 13A, the transaction data indicating that user A has purchased the right to use unit 31 with ID0002 (S107). In this embodiment, receiving the second transaction data, which indicates that user A has purchased the right to use unit 31 with ID0002, from user request processor 22, smart contractor 14A sends the second transaction data to server 10 and causes distributed ledger 13A to record the second transaction data.

Figure 12:
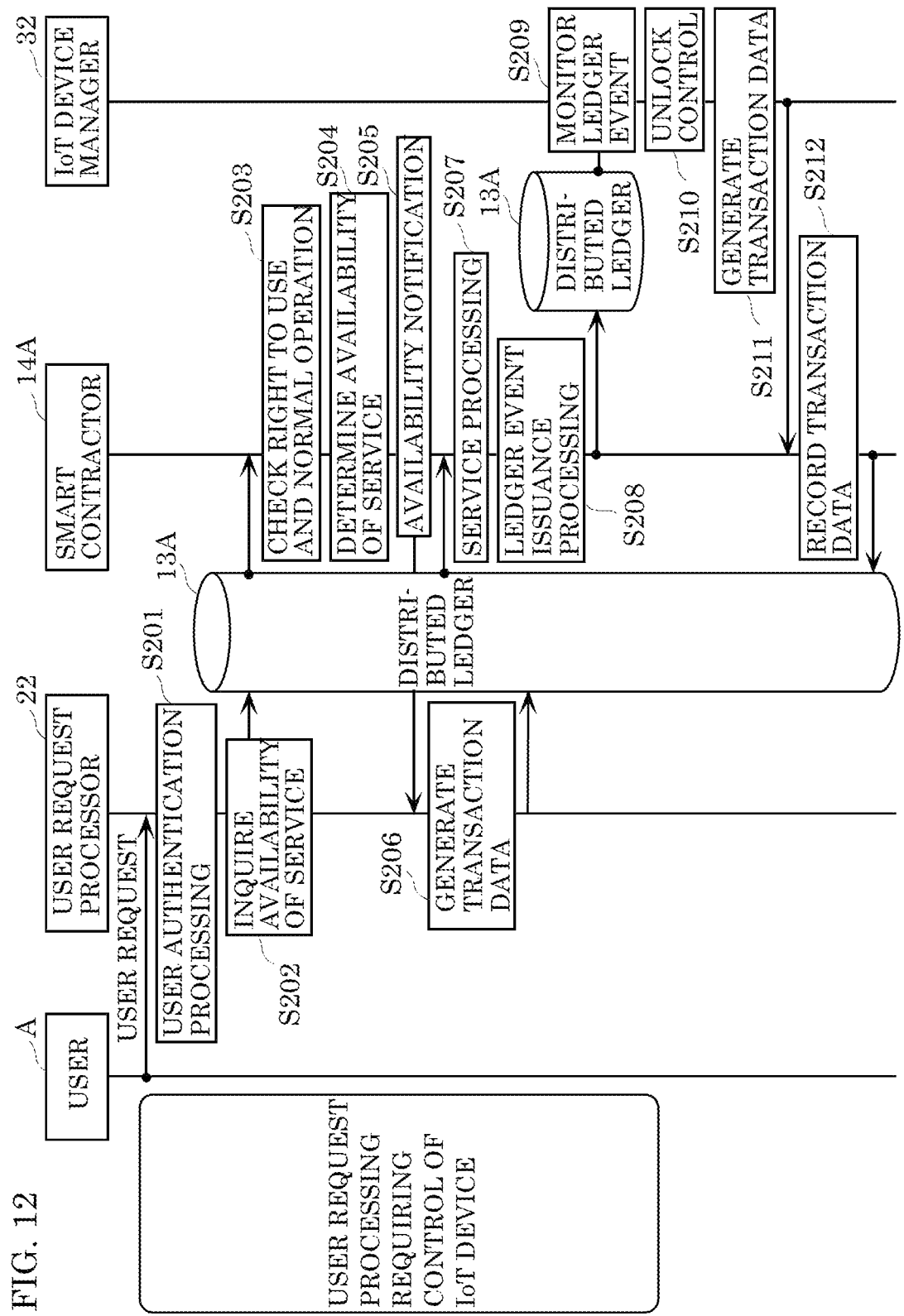
FIG. 12 is a sequence diagram showing user request processing requiring the control of the IoT device according to the embodiment.

User Request Processing Requiring Control of IoT Device 30 FIG. 12 is a sequence diagram showing user request processing requiring the control of IoT device 30 according to this embodiment. FIG. 13A shows an example data structure of the availability notification used in the user request processing shown in FIG. 12. FIGS. 13B and 13C show example data structures of transaction data used in the user request processing shown in FIG. 12. An example will be described with reference to FIG. 12 where target IoT device 30 is not malfunctioning and user A has purchased the right to use target IoT device 30.

As shown in FIG. 12, first, user A makes, to terminal 21, a user request to unlock unit 31 with ID0002 of IoT device 30, for example. Then, user request processor 22 of terminal 21 receives the user request and performs the processing of authenticating user A who has made the user request (S201).

Next, if user A has been successfully authenticated in step S101, user request processor 22 makes an inquiry to distributed ledger 13A whether unit 31 with ID0002 is available (S202). In this embodiment, user request processor 22 issues, to distributed ledger 13A, the transaction data with the data structure shown in FIG. 11A to operate smart contractor 14A.

Then, smart contractor 14A checks the latest status in distributed ledger 13A to check the status of the right to use unit 31 with ID0002 and whether unit 31 with ID0002 is operating normally (S203).

After that, smart contractor 14A determines whether the service of unit 31 with ID0002 is available based on the checked status of the right to use unit 31 with ID0002 and the fact that unit 31 with ID0002 is operating normally (S204). Here, since the user has purchased the right to use unit 31 with ID0002 and unit 31 with ID0002 is operating normally, smart contractor 14A determines that unit 31 with ID0002 is available.

Next, smart contractor 14A determines that unit 31 with ID0002 is available, and thus sends the availability notification to user request processor 22 of terminal 21 (S205). In this embodiment, smart contractor 14A sends the availability notification with the data structure shown in FIG. 13A to user request processor 22. FIG. 13A shows the data structure of the availability notification including "0002" indicating the identification information on unit 31 with ID0002, "usrA" indicating that user A has purchased the right to use unit 31 with ID0002, and "¥100" indicating the purchased amount of the right to use.

Then, user request processor 22 issues, to distributed ledger 13A, the transaction data indicating a request to unlock unit 31 with ID0002 (S206). In this embodiment, user request processor 22 generates transaction data with the data structure shown in FIG. 13B and sends the transaction data to distributed ledger 13A to operate smart contractor 14A. FIG. 13B shows the transaction data with the data structure including "usrA" indicating that user A is the requester. "0002" indicating the identification information on unit 31 with ID0002, and "open" indicating a request to unlock unit 31 with ID0002.

After that, obtaining the transaction data indicating the request for the unlock from user request processor 22, smart contractor 14A performs service processing of shifting the lock/unlock status of unit 31 with ID0002 held on the memory to "open", that is, to "unlocked" (S207). Smart contractor 14A changes the lock/unlock status of unit 31 with ID0002 recorded in distributed ledger 13A (S208). More specifically, smart contractor 14A sends, to server 10A including distributed ledger 13A, transaction data indicating a request for the unlock. Then, server 10A synchronizes the block containing the transaction data on the request for the lock/unlock with the consensus algorithm, and then records the block in distributed ledger 13A to cause a change in the status on distributed ledger 10A.

Next, IoT device manager 32 monitors ledger events such as the lock/unlock status of IoT device 30 held on the memory to grasp that the lock/unlock status of unit 31 with ID0002 has shifted to "unlocked" (S209).

Next, IoT device manager 32 performs unlock control to unlock unit 31 with ID0002 (S210), and generates the third transaction data indicating the unlock of unit 31 with ID0002 (S211). Then, IoT device manager 32 sends the generated third transaction data to distributed ledger 13A. In this embodiment, IoT device manager 32 generates the third transaction data with the data structure shown in FIG. 13C, and sends the third transaction data to distributed ledger 13A. FIG. 13C shows the transaction data with the data structure including "dev" indicating that IoT device manager 32 is the conductor, "0002" indicating the identification information on unit 31 with ID0002, and "regist_opened" indicating the unlock.

Next, obtaining the third transaction data, smart contractor 14A causes distributed ledger 13A to record the third transaction data (S212).

Malfunction Detection Processing of IoT Device 30

Figure 14:
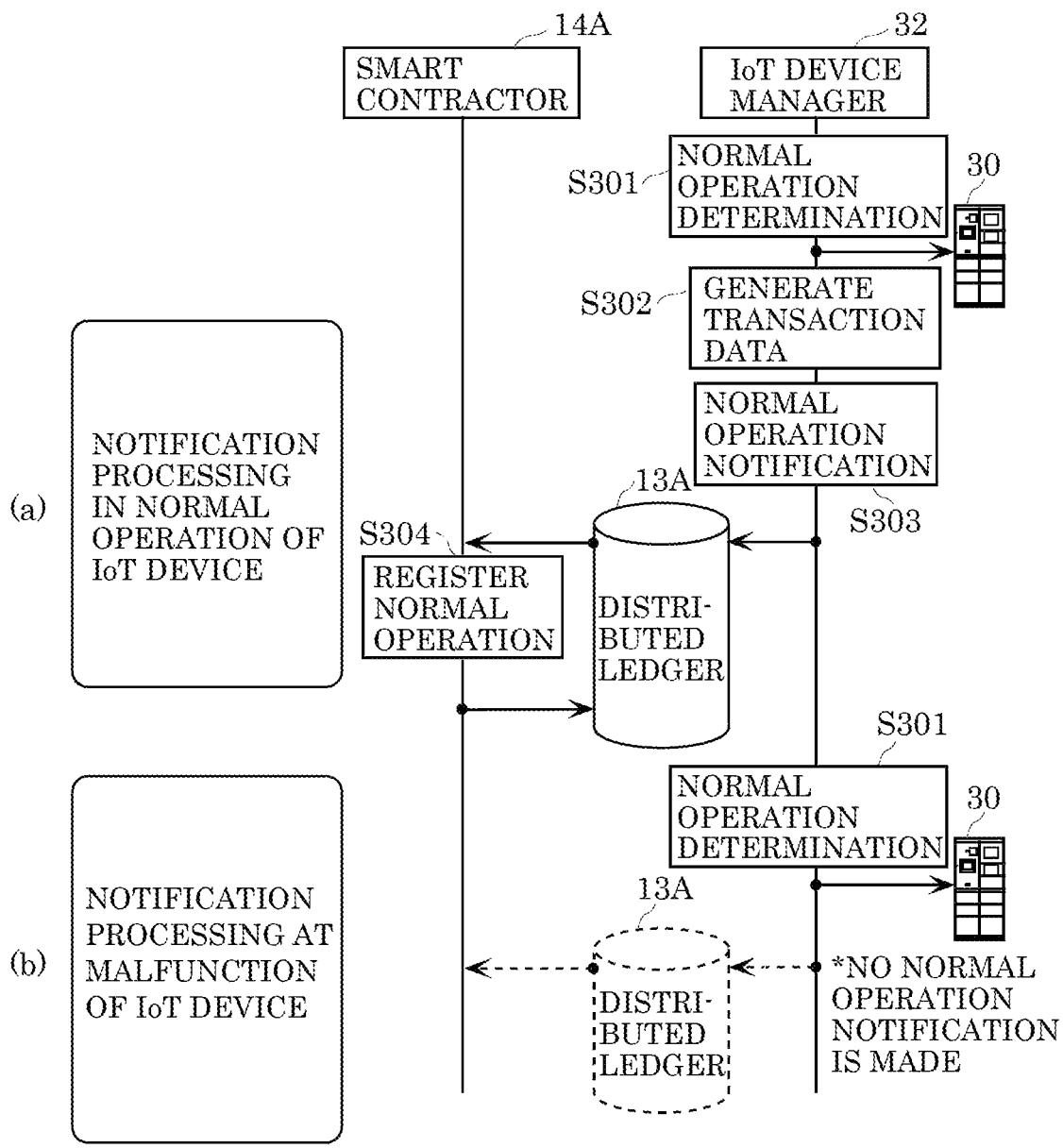
FIG. 14 is a sequence diagram showing notification processing in a normal operation and at a malfunction of the IoT device according to the embodiment.

FIG. 14 is a sequence diagram showing notification processing in a normal operation and at a malfunction of IoT device 30 according to this embodiment. FIG. 15 shows an example data structure of transaction data used in the notification processing shown in FIG. 14. In FIG. 14, (a) shows the notification processing when unit 31 assigned with ID0002 is determined to be operating normally which is one of three units 31 constituting target IoT device 30. In FIG. 14, (b) shows the notification processing at a malfunction of unit 31 assigned with ID0002.

First, the notification processing shown in (a) of FIG. 14 will be described where it is determined that unit 31 assigned with ID0002 is operating normally.

Specifically, in (a) of FIG. 14, IoT device manager 32 of IoT device 30 performs normal operation determination of checking whether unit 31 assigned with ID0002 of IoT device 30 is operating normally (S301). In step S301, since unit 31 assigned with ID0002 is operating normally, IoT device manager 32 determines that unit 31 assigned with ID0002 is operating normally.

Then, IoT device manager 32 generates the first transaction data indicating that unit 31 with ID0002 is operating normally (S302). IoT device manager 32 performs normal operation notification of sending, to smart contractor 14A, the first transaction data generated in step S302 as operation notification information indicating that unit 31 assigned with ID0002 is operating normally (S303). In this embodiment, IoT device manager 32 generates the first transaction data with the data structure shown in FIG. 15. FIG. 15 shows the transaction data with the data structure including "dev" indicating that IoT device manager 32 is the detector, "0002" indicating the identification information on unit 31 with ID0002, and "enabled" indicating that this unit 31 is operating normally and available. Note that the data structure shown in FIG. 15 corresponds to an example data structure including the identification information indicating unit 31 assigned with ID0002, and notification indicating that unit 31 assigned with ID0002 is operating. IoT device manager 32 issues the first transaction data generated in this manner to distributed ledger 13A to operate smart contractor 14A.

Next, smart contractor 14A performs normal operation registration of updating the status information on unit 31 with ID0002 held on the memory (S304). In this embodiment, smart contractor 14A writes and holds the status information on IoT device 30 on the memory of server 10A to manage the status information. Thus, smart contractor 14A updates the normal operation notification time of the status information on unit 31 with ID0002 to perform the normal operation registration.

In this embodiment, smart contractor 14A obtains the first transaction data from IoT device manager 32. Accordingly, smart contractor 14A sends the obtained first transaction data to distributed ledger 13A to cause distributed ledger 13A to record the first transaction data.

Now, the notification processing shown in (b) of FIG. 14 will be described where unit 31 assigned with ID0002 is malfunctioning.

Specifically, in (b) of FIG. 14, IoT device manager 32 of IoT device 30 performs normal operation determination of checking unit 31 assigned with ID0002 of IoT device 30 is operating normally (S305).

In step S301, since unit 31 assigned with ID0002 is malfunctioning, IoT device manager 32 cannot check the operating state of unit 31 assigned with ID0002. Accordingly, IoT device manager 32 does not perform the normal operation notification of sending, to smart contractor 14A the operation notification information indicating that unit 31 assigned with ID0002 is operating normally.

Since smart contractor 14A does not perform the normal operation registration, the status information on unit 31 with ID0002 held on the memory is not updated.

FIGS. 16A and 16B show the status information managed by smart contractor 14A according to the embodiment. FIG. 16A shows example status information where all of three units 31 constituting IoT device 30 are operating normally. FIG. 16A shows that user A has purchased the right to use unit 31 with ID0001. The table shows that the right to use units 31 with ID0002 and ID0003 belong to the service company and are thus available for purchase, that is, available for use. The normal operation notification times correspond to the time information indicating the time of obtaining operation notification information indicating that ID0001 to ID0003 are operating normally. Since the normal operation notification times of all of ID0001 to ID0003 are "9/26 10:00", it is found that all of ID0001 to ID0003 are operating normally. On the other hand, FIG. 16B shows example status information where unit 31 with ID0002 of three units 31 constituting IoT device 30 is malfunctioning. That is, in this embodiment, as is clear from the comparison between the status information shown in FIGS. 16A and 16B, smart contractor 14A does not update the normal operation notification time of unit 31 with ID0002 in FIG. 16B. More specifically, the normal operation notification times of ID0001 and ID0003 are "9/26 11:00" and the normal operation notification time of ID0002 is "9/26 10:00". It is found the unit with ID0002 is malfunctioning.

In this manner, the latest status information is read out and checked to find out malfunctioning IoT device 30.

Figure 18:
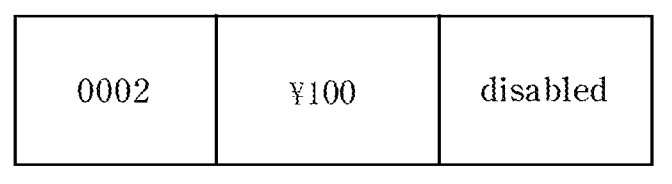

Another Example User Request Processing Requiring No Control of IoT Device FIG. 17 is a sequence diagram showing another example user request processing requiring no control of IoT device 30 according to this embodiment. FIG. 18 shows an example data structure of the unavailability notification used in the user request processing shown in FIG. 17. The example of FIG. 17 will be described below where the rights to use all of three units 31 constituting target IoT device 30 are available for purchase but unit 31 assigned with ID0002 is malfunctioning.

As shown in FIG. 17, first, user A makes, to terminal 21, a user request for permission to use unit 31 with ID0002 of IoT device 30, for example. Then, user request processor 22 of terminal 21 receives the user request and performs the processing of authenticating user A who has made the user request (S401).

Next, if user A has been successfully authenticated in step S401, user request processor 22 makes an inquiry to distributed ledger 13A whether unit 31 with ID0002 is available (S402). In this embodiment, user request processor 22 issues, to distributed ledger 13A, transaction data with the data structure shown in FIG. 11A to operate smart contractor 14A. FIG. 11A has been described above and the description thereof will thus be omitted.

Then, smart contractor 14A checks the latest status in distributed ledger 13A to check the status of the right to use unit 31 with ID0002 and whether unit 31 with ID0002 is operating normally (S403).

After that, smart contractor 14A determines whether the service of unit 31 with ID0002 is available based on the checked status of the right to use unit 31 with ID0002 and the fact that unit 31 with ID0002 is operating normally (S404). Here, since the right to use unit 31 with ID0002 is available for purchase but unit 31 with ID0002 is malfunctioning, smart contractor 14A determines that unit 31 with ID0002 is unavailable.

Determining that unit 31 with ID0002 is unavailable, smart contractor 14A sends the unavailability notification to user request processor 22 of terminal 21 (S405). In this embodiment, smart contractor 14A sends the unavailability notification with the data structure shown in FIG. 18 to user request processor 22. FIG. 18 shows the data structure of the unavailability notification including "0002" indicating the identification information on unit 31 with ID0002, "disabled" indicating that unit 31 with ID0002 is unavailable, and "¥100" indicating the amount to purchase the right to use.

Receiving the unavailability notification, user request processor 22 sends the unavailability notification to user A (S406) to notify user A of the fact that the permission to use unit 31 with ID0002 is unavailable.

In this manner, user A cannot acquire the permission to use malfunctioning IoT device 30. There is thus no need to actually move to the malfunctioning IoT device, causing no extra work or waste of time or energy for the movement.

Advantages

As described above, the control method and the control system according to the present disclosure allow periodical recording, in the distributed ledger, of the operation notification information including the fact that the IoT device is operating normally. If the difference between the current time and the time of obtaining the recent operation notification information is larger than or equal to a threshold, a malfunction of the IoT device is determined. With the method and configuration, user A does not acquire the permission to use the malfunctioning IoT device in a place different from the actual location of the IoT device. There is thus no need for user A to actually move to the malfunctioning IoT device, causing no extra work or waste of time or energy for the movement. In this manner, the time and energy costs can be further reduced using the distributed ledger.

In another point of view, the control method and control system 1 according to the present disclosure include the method of periodically notifying that IoT device is operating normally using the smart contract.

Here, PKI (i.e., a signature) is used for the method of notifying that IoT device is operating normally to guarantee that the IoT device itself has made the notification. Then, the IoT device utilizes the method for the notification to periodically notify the smart contract of the fact that the device itself is operating normally. In this manner, the IoT device is provided with a private key to establish the mechanism of notifying the smart contract of the fact that the device itself is operating normally.

If the notification from the IoT device stops, the smart contract determines that the serve is difficult to provide, and stops the service. More specifically, the smart contract refers to the previous notification information. If the difference between the current time and the time of obtaining the previous notification information is larger than or equal to the threshold, the smart contract determines that the service is unavailable, and stops the service.

In this manner, since the service of a malfunctioning IoT device stops, users cannot acquire the permission to use the malfunctioning IoT device. There is thus no need to actually move to the malfunctioning IoT device, causing no extra work or waste of time or energy for the movement.

Figure 19:
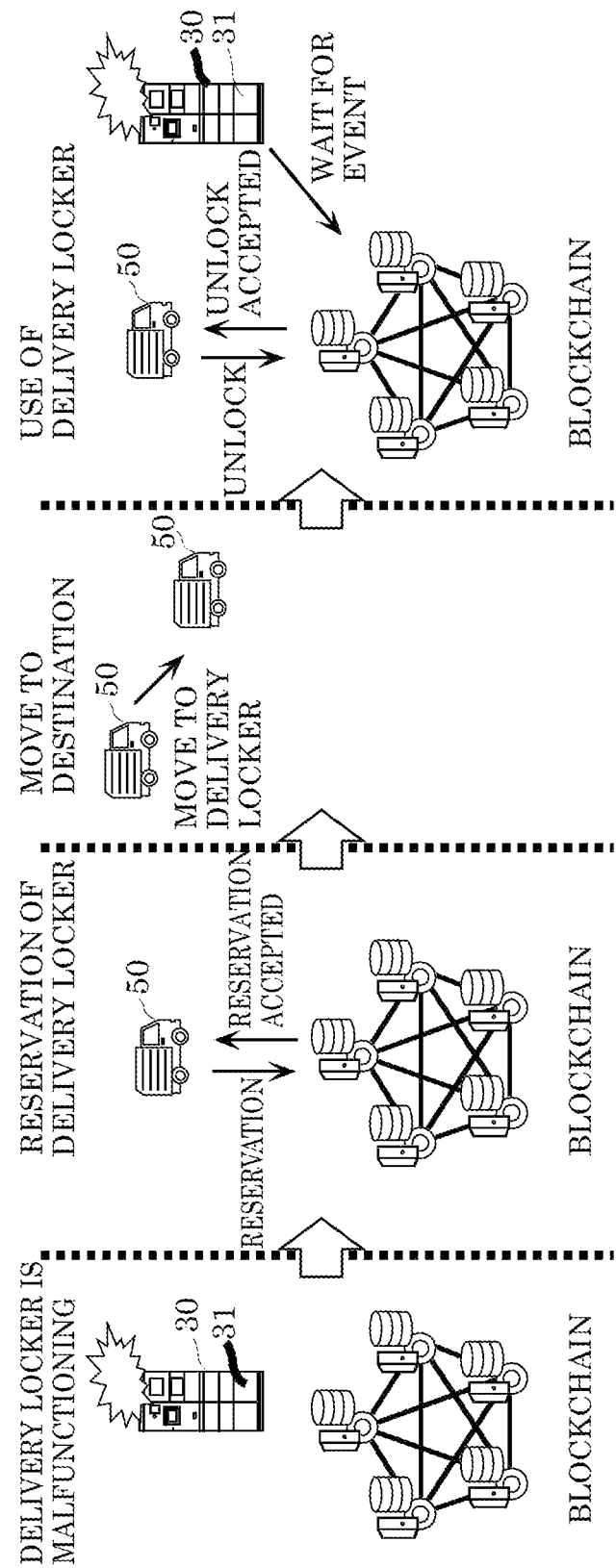
FIG. 19 schematically shows a problem in a comparative example.
Figure 20:
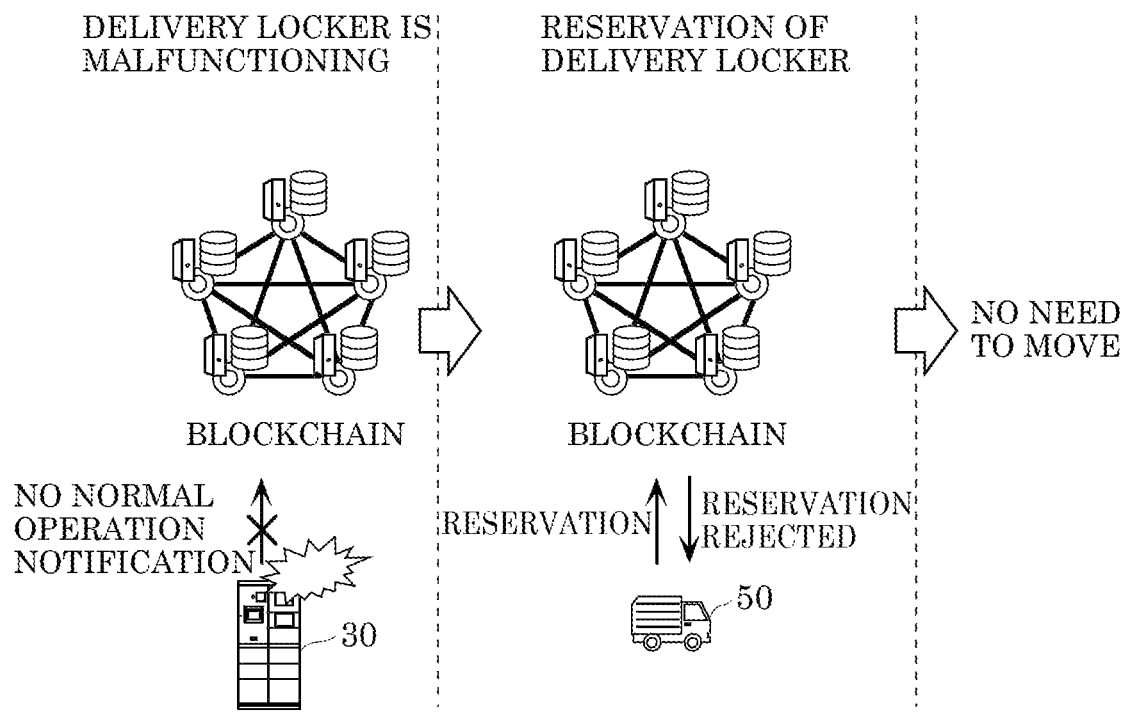
FIG. 20 schematically shows an advantage of the present disclosure.

Advantages of the control method and control system 1 according to the present disclosure will be described with reference to FIGS. 19 and 20. FIG. 19 schematically shows a problem in a comparative example. FIG. 20 schematically shows the advantage according to the present disclosure. FIGS. 19 and 20 will be described where unit 31 is malfunctioning which is one of the plurality of units 31 constituting IoT device 30 that is a delivery locker, for example.

As shown in FIG. 19, in the comparative example, delivery person 50 does not know that the one of units 31 for use is malfunctioning. In order to deliver a package to the one of units 31, the one of units 31 can be reserved by purchasing the right to use. Accordingly, after purchasing the right to use the one of units 31, delivery person 50 moves to the location of the unit. However, the one of units 31 is malfunctioning and not operating, even if delivery person 50 tries to unlock the unit for use after arriving at the location.

The movement to the malfunctioning one of units 31 is unnecessary extra work and a waste of time and energy.

On the other hand, as shown in FIG. 20, in the present disclosure, delivery person 50 cannot reserve one of units 31 to deliver a package to the one of units 31, even without knowing that the one of units 31 is malfunctioning. There is thus no need for delivery person 50 to actually move to the malfunctioning IoT device, causing no extra work or waste of time or energy for the movement.

The control method and the control system according to the present disclosure employ the distributed ledger and are thus advantages in managing all the history, without allowing any falsification. The history includes since when the IoT device has malfunctioned or when the deal was made for the use of the IoT device.

The control method and the control system according to the present disclosure allow storage of programs regarding the trade conditions as the smart contract in the distributed ledger. This allows periodical recording, in the distributed ledger, of the operation notification information including the fact that the IoT device is operating normally. If the difference between the current time and the time of obtaining the recent operation notification information is larger than or equal to the threshold, a malfunction of the IoT device can be determined. In this manner, the information indicating whether the IoT device is malfunctioning can be open to the public without allowing any falsification using a blockchain, which reduces fraud transactions.

Assume that the IoT device has malfunctioned since the start of the service of the IoT device. In this case, the control method and the control system according to the present disclosure not only determine that the IoT device is malfunctioning and notify the user of the fact but also record the fact as an evidence in the distributed ledger. With the method and configuration, the user of the IoT device and the provider of the service of the IoT device quickly cope with the problem and thus reduces damages as much as possible.

Having been described above based on the embodiment, the present disclosure is obviously not limited thereto. The present disclosure includes the following cases.

(1) For example, the present disclosure includes a data structure used for a block recorded as a blockchain in control system 1 according to the embodiment described above. More specifically, the data structure according to the present disclosure is used for a block to be recorded in a distributed ledger in a system. The system includes one or more IoT devices and a plurality of servers communicative with the one or more IoT devices via a network. The data structure includes the first transaction data including operation notification information and time information. The operation notification information includes identification information on each of the one or more IoT devices and a notification indicating that the one or more IoT devices are operating. The time information indicates the time of obtaining the operation notification information. When the smart contract stored in the distributed ledger is executed, the first transaction data included in the data structure according to the present disclosure is obtained by a first server of the plurality of servers, and the obtained first transaction data is contained in the block so as to be recorded in the distributed ledger.

(2) Note that an example has been described in the present disclosure where a blockchain is a blockchain mounting board achieving distributed ledger management. The configuration is not limited thereto. Other blockchain mounting boards such as the Hyperledger Fabric may be used.

(3) Each of the devices in the embodiment described above may be a computer system including, specifically, a microprocessor, a ROM, a RAM, a hard disk unit, a display unit, a keyboard, or a mouse. The RAM or the hard disk unit stores computer programs. The microprocessor operates in accordance with the computer programs so that the devices fulfill their functions. The computer programs are here obtained by combining instruction codes indicating instructions to the computer to fulfill predetermined functions.

(4) Some or all of the constituent elements of each of the devices in the embodiment described above may serve as a single system large-scale integrated (LSI) circuit. The system LSI circuit is a super multifunctional LSI circuit manufactured by integrating a plurality of components on a single chip, and specifically is a computer system including a microprocessor, a ROM, and a RAM, for example. The RAM stores computer programs. The microprocessor operates in accordance with the computer programs so that the system LSI circuit fulfils its function.

The constituent elements of the devices may be configured as respective chips, or some or all of the constituent elements may be included into a single chip.

While the system LSI circuits are named here, the integrated circuits may be referred to ICs. LSI circuits, super LSI circuits, or ultra LSI circuits depending on the degree of integration. The circuit integration is not limited to the LSI. The devices may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed.

Appearing as an alternative circuit integration technology to the LSI, another technology that progresses or deprives from the semiconductor technology may be used for integration of functional blocks. Biotechnology is also applicable.

(5) Some or all of the constituent elements of each of the devices described above may serve as an IC card or a single module detachably attached to the device. The IC card or the module is a computer system including a microprocessor, a ROM, and a RAM, for example. The IC card or the module may include the super multifunctional LSI circuit described above. The microprocessor operates in accordance with computer programs so that the IC card or the module fulfils its function. This IC card or this module may have a tamper resistance.

(6) The present disclosure may be directed to the method described above. The present disclosure may also be directed to computer programs causing a computer to execute this method or digital signals indicating the computer programs.

The present disclosure may be directed to a computer readable storage medium capable of recording computer programs or digital signals, for example, a flexible disk, a hard disk, a CD-ROM, an MO, a DVD, a DVD-ROM, a DVD-RAM, a Blu-ray Disk (BD, registered trademark), or a semiconductor memory, for example. The present disclosure may be directed to the digital signals stored in these recording media.

In the present disclosure, the computer programs or the digital signals may be transferred via telecommunication lines, wireless or wired communication lines, networks represented by the internet, or data broadcasts, for example.

The present disclosure may be directed to a computer system including a microprocessor and a memory. The memory may store the computer programs described above, whereas the microprocessor may operate in accordance with the computer programs.

The programs or the digital signals may be stored in a storage medium and then transferred, or may be transferred via a network, so as to be executed by another independent computer system.

(7) The embodiment and variation described above may be combined.

Although only an exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The present disclosure is applicable to a control method, a control system, a first server, and a data structure. The present disclosure is applicable to a control method, a control system, a first server, and a data structure that record, in a distributed ledger, a result of detecting a malfunction of an IoT device such as a delivery locker, a car for sharing, a motorcycle for sharing, or a hotel room, using a smart contract stored in the distributed ledger.

What is claimed is:

1. A control method executed by a first server of a plurality of servers in a system including one or more Internet of Things (IoT) devices and the plurality of servers communicative with the one or more IoT devices via a network, the control method comprising:
   obtaining first transaction data including operation notification information and time information from each of the one or more IoT devices, the operation notification information including identification information on the IoT device and a notification indicating that the IoT device is operating normally, the time information indicating a time when the IoT device has obtained the operation notification information;
   transferring the first transaction data obtained, to a plurality of second servers that are the plurality of servers other than the first server;
   executing, together with the plurality of second servers, a first consensus algorithm for an agreement on an authenticity of the first transaction data; and
   recording a block containing the first transaction data in a distributed ledger of the first server, when the authenticity of the first transaction data is verified by the first consensus algorithm, wherein
   the system further includes a terminal communicative with the plurality of servers via the network and used by a user, and
   the control method further comprises:
      reading out status information indicating whether each of the one or more IoT devices is available based on whether the operation notification information has been obtained within a predetermined time, when a user request by the user inquiring whether an IoT device of the one or more IoT devices is available is received from the terminal; and
      sending, to the terminal, a first signal indicating that the IoT device is permitted for use under a predetermined condition, when the IoT device is determined to be available based on the status information read out.

2. The control method according to claim 1, further comprising:
   sending, to the terminal, a signal indicating that the IoT device is not permitted for use, when the IoT device is determined to be unavailable based on the status information read out.

3. The control method according to claim 1, further comprising:
   transferring, to the plurality of second servers, second transaction data indicating a purchase of a right to use the IoT device, when the second transaction data is obtained from the terminal;
   executing, together with the plurality of second servers, a second consensus algorithm for an agreement on an authenticity of the second transaction data; and
   recording a block containing the second transaction data in the distributed ledger of the first server, when the authenticity of the second transaction data is verified by the second consensus algorithm.

4. The control method according to claim 3, wherein the status information further includes an open/closed status of the IoT device, and
   the control method further comprising:
      obtaining, from the terminal, third transaction data indicating a request to unlock the IoT device based on the right to use;
      transferring the third transaction data obtained, to the plurality of second servers;
      executing, together with the plurality of second servers, a third consensus algorithm for an agreement on an authenticity of the third transaction data; and
      recording a block containing the third transaction data in the distributed ledger of the first server to change the open/closed status of the IoT device included in the status information, when the authenticity of the third transaction data is verified by the third consensus algorithm.

5. The control method according to claim 1, further comprising:
   reading out the first transaction data recorded in the distributed ledger;
   generating the status information based on the first transaction data read out, and writing the status information on a memory of the first server; and
   reading out the status information on the memory, when the user request is received from the terminal.

6. The control method according to claim 1, wherein the time information is a timestamp at a time of obtaining the notification indicating that the IoT device is operating normally or a sequence number.

7. The control method according to claim 1, further comprising:
   executing a smart contract stored in the distributed ledger to generate the first transaction data, when the operation notification information is obtained.

8. A control system, comprising:
   one or more IoT devices; and
   a plurality of servers communicative with the one or more IoT devices via a network, wherein
   a first server of the plurality of servers:
      obtains first transaction data including operation notification information and time information from each of the one or more IoT devices, the operation notification information including identification information on the IoT device and a notification indicating that the IoT device is operating normally, the time information indicating a time when the IoT device has obtained the operation notification information;
      transfers the first transaction data obtained, to a plurality of second servers that are the plurality of servers other than the first server;
      executes, together with the plurality of second servers, a first consensus algorithm for an agreement on an authenticity of the first transaction data; and
      records a block containing the first transaction data in a distributed ledger of the first server, when the authenticity of the first transaction data is verified by the first consensus algorithm, wherein the control system further includes a terminal communicative with the plurality of servers via the network and used by a user, and the first server further:
  reads out status information indicating whether each of the one or more IoT devices is available based on whether the operation notification information has been obtained within a predetermined time, when a user request by the user inquiring whether an IoT device of the one or more IoT devices is available is received from the terminal; and
  sends, to the terminal, a first signal indicating that the IoT device is permitted for use under a predetermined condition, when the IoT device is determined to be available based on the status information read out.

9. A first server of a plurality of servers in a system including one or more IoT devices and the plurality of servers communicative with the one or more IoT devices via a network, the first server comprising:
  a processor;
  a memory that stores a program causing the processor to execute processing; and
  a storage device that stores a distributed ledger storing a smart contract, wherein
  the processor executes the smart contract stored in the distributed ledger to obtain first transaction data including operation notification information and time information from each of the one or more IoT devices, the operation notification information including identification information on the IoT device and a notification indicating that the IoT device is operating normally, the time information indicating a time when the IoT device has obtained the operation notification information, and
  by executing the program stored on the memory, the processor:
    transfers the first transaction data obtained, to a plurality of second servers that are the plurality of servers other than the first server;
    executes, together with the plurality of second servers, a first consensus algorithm for an agreement on an authenticity of the first transaction data; and
    records a block containing the first transaction data in the distributed ledger of the first server, when the authenticity of the first transaction data is verified by the first consensus algorithm, wherein
  the system further includes a terminal communicative with the plurality of servers via the network and used by a user, and
  by executing the program stored on the memory, the processor further:
    reads out status information indicating whether each of the one or more IoT devices is available based on whether the operation notification information has been obtained within a predetermined time, when a user request by the user inquiring whether an IoT device of the one or more IoT devices is available is received from the terminal; and
    sends, to the terminal, a first signal indicating that the IoT device is permitted for use under a predetermined condition, when the IoT device is determined to be available based on the status information read out.

10. A data structure used for a block to be recorded in a distributed ledger, in a system including one or more IoT devices and a plurality of servers communicative with the one or more IoT devices via a network, the data structure comprising:
  first transaction data including operation notification information and time information, the operation notification information including identification information on each of the one or more IoT devices and a notification indicating that the IoT device is operating normally, the time information indicating a time of obtaining the operation notification information, wherein
  the first transaction data is obtained by a first server of the plurality of servers through execution of a smart contract stored in the distributed ledger,
  the first transaction data obtained is contained in the block so as to be recorded in the distributed ledger,
  the system further includes a terminal communicative with the plurality of servers via the network and used by a user, and
  the first server:
    reads out status information indicating whether each of the one or more IoT devices is available based on whether the operation notification information has been obtained within a predetermined time, when a user request by the user inquiring whether an IoT device of the one or more IoT devices is available is received from the terminal; and
    sends, to the terminal, a first signal indicating that the IoT device is permitted for use under a predetermined condition, when the IoT device is determined to be available based on the status information read out.

* * * * *